United States Patent
Takeuchi et al.

(10) Patent No.: US 9,727,857 B2
(45) Date of Patent: Aug. 8, 2017

(54) PORTABLE INFORMATION PROCESSING DEVICE, SETTLEMENT SYSTEM, RECORDING MEDIUM, AND INFORMATION PROCESSING METHOD

(71) Applicant: NINTENDO CO., LTD., Kyoto (JP)

(72) Inventors: Hiroyuki Takeuchi, Kyoto (JP); Ryuichi Yoshida, Kyoto (JP); Hiroto Yada, Kyoto (JP); Yasumasa Nakai, Kyoto (JP); Tatsuya Niwa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 411 days.

(21) Appl. No.: 14/594,632

(22) Filed: Jan. 12, 2015

(65) Prior Publication Data

US 2016/0162880 A1 Jun. 9, 2016

(30) Foreign Application Priority Data

Dec. 8, 2014 (JP) ................................ 2014-248487

(51) Int. Cl.
*G06Q 20/34* (2012.01)
*G06Q 20/40* (2012.01)

(52) U.S. Cl.
CPC ......... *G06Q 20/352* (2013.01); *G06Q 20/341* (2013.01); *G06Q 20/409* (2013.01)

(58) Field of Classification Search
CPC .............................. A63F 13/12; H04W 4/008
See application file for complete search history.

(56) References Cited

U.S. PATENT DOCUMENTS

| 2006/0194632 | A1* | 8/2006 | Hendrickson | ........... A63F 13/12 463/42 |
| 2010/0312381 | A1 | 12/2010 | Kameda | |
| 2012/0071151 | A1* | 3/2012 | Abramson | .............. H04L 67/12 455/418 |
| 2012/0252578 | A1* | 10/2012 | Ozaki | ................... G06T 11/001 463/36 |

(Continued)

FOREIGN PATENT DOCUMENTS

| JP | 2006-340069 | 12/2006 |
| JP | 2008-083943 | 4/2008 |

(Continued)

*Primary Examiner* — David Bilodeau
(74) *Attorney, Agent, or Firm* — Nixon & Vanderhye P.C.

(57) ABSTRACT

A device of an example is a portable information processing device performing settlement processing concerning purchase of a merchandise article or a right in cooperation with a given server, comprising: a non-contact communication unit performing non-contact communication with a data storage medium; a data acquisition unit acquiring data stored in the data storage medium, through the non-contact communication unit as a part of the settlement processing; a settlement processing unit performing settlement based on the data acquired by the data acquisition unit, in cooperation with the server, as a part of the settlement processing; a detection unit detecting at least one of attitude, movement, and a placement state of the own device; and a restriction unit acquiring a detection result from the detection unit and then, when the detection result does not satisfy a given condition, restricting performing of at least a part of the settlement processing.

35 Claims, 20 Drawing Sheets

(56) References Cited

U.S. PATENT DOCUMENTS

2013/0324045 A1 12/2013 Shimohata et al.
2014/0256430 A1 9/2014 Matsumura

FOREIGN PATENT DOCUMENTS

| JP | 2008-310713 | 12/2008 |
| JP | 2009-205631 | 9/2009 |
| JP | 2009-251981 | 10/2009 |
| JP | 2010-015532 | 1/2010 |
| JP | 2010-020498 | 1/2010 |
| JP | 2010-097314 | 4/2010 |
| JP | 2011-129030 | 6/2011 |
| JP | 2011-141679 | 7/2011 |
| JP | 2011-141815 | 7/2011 |
| JP | 2013-251817 | 12/2013 |
| JP | 2014-171678 | 9/2014 |

* cited by examiner

F I G. 4

BALANCE HISTORY INFORMATION

| UPDATE DATE | BALANCE | UPDATE ID |
|---|---|---|
| ... | ... | ... |
| 2014/3/10, 17:55 | 20000 | A5519 |
| 2014/3/28, 9:12 | 10200 | D3677 |
| ... | ... | ... |

FIG. 6

SALES HISTORY INFORMATION

| TRANSACTION ID | USER ID | FOR-SALE MERCHANDISE INFORMATION | TOTAL PRICE |
|---|---|---|---|
| ... | ... | ... | ... |
| A0110 | USER a | MERCHANDISE A | 9800 |
| A0111 | USER b | MERCHANDISE B | 1200 |
| A0112 | USER c | MERCHANDISE C | 5515 |
| ... | ... | ... | ... |

| SETTLEMENT REQUEST DATE AND TIME | SETTLEMENT RESULT | SALES PROCESSING STATUS |
|---|---|---|
| ... | ... | ... |
| 2014/3/28, 9:12 | COMPLETED SETTLEMENT | COMPLETE |
| 2014/3/28, 14:48 | FAILED SETTLEMENT | NOT COMPLETE |
| 2014/3/29, 0:21 | NO RECEIVING | NOT COMPLETE |
| ... | ... | ... |

FIG. 8

SETTLEMENT HISTORY INFORMATION

| TRANSACTION ID | SETTLEMENT STATUS | CARD ID | UPDATE ID | SETTLEMENT DATE AND TIME |
|---|---|---|---|---|
| ... | ... | ... | ... | ... |
| A0110 | FINISHED SETTLEMENT | CA541 | D3677 | 2014/3/28, 9:12 |
| A0111 | INCOMPLETE PROCESSING | CB927 | D3678 | 2014/3/28, 14:48 |
| A0112 | UNFINISHED SETTLEMENT | CD679 | D3679 | 2014/3/29, 0:21 |
| ... | ... | ... | ... | ... |

F I G. 1 7
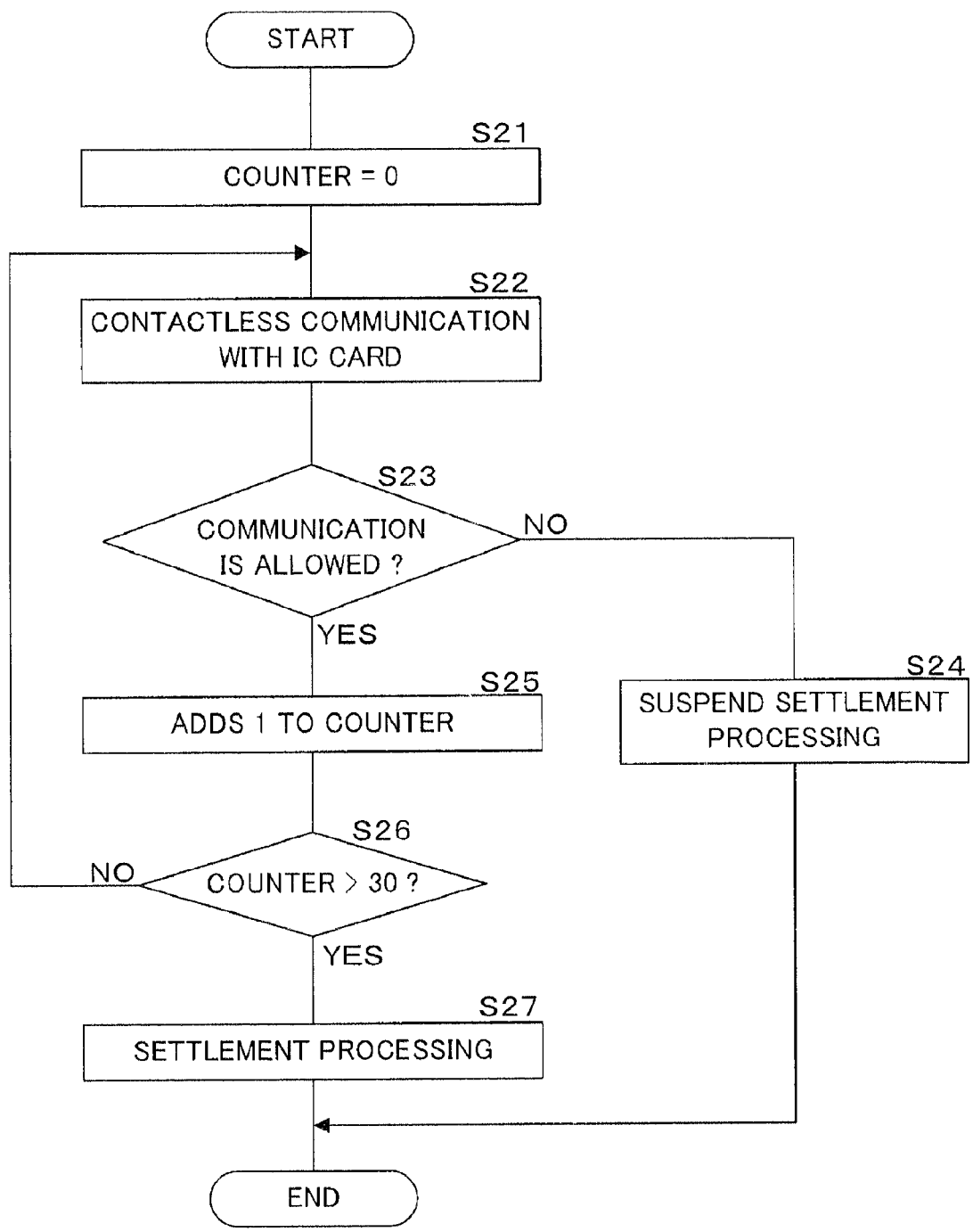

F I G. 1 8
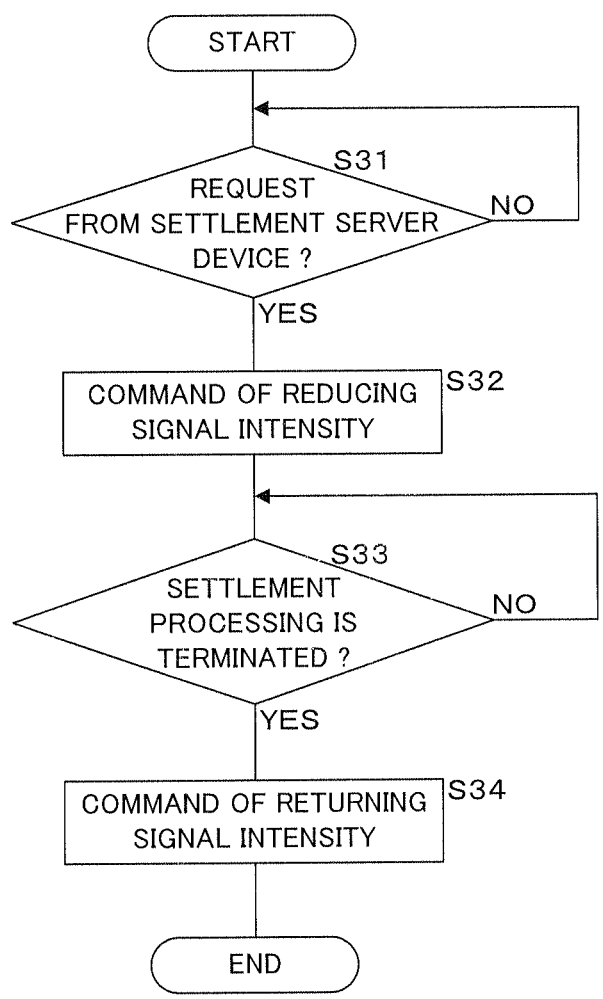

PORTABLE INFORMATION PROCESSING DEVICE, SETTLEMENT SYSTEM, RECORDING MEDIUM, AND INFORMATION PROCESSING METHOD

CROSS-REFERENCE TO RELATED APPLICATIONS

This application is based upon and claims the benefit of priority of the prior Japanese Patent Application No. 2014-248487, filed on Dec. 8, 2014, the entire contents of which are incorporated herein by reference.

FIELD

The present invention relates to a portable information processing device, a settlement system, a recording medium, and an information processing method of performing purchase processing by using a data storage medium.

BACKGROUND AND SUMMARY

In the conventional art, systems like purchase and sale systems for so-called online shopping or the like are spread widely in which a user accesses a server device through a network by using an information processing device such as a game device, a personal computer, and a smartphone so as to perform transmission and reception of information between the information processing device and the server device, and thereby performs purchase and sale of a merchandise article or the like. In such a purchase and sale system, various kinds of means are provided as methods of payment of the counter value of the purchased merchandise article. For example, such payment methods include a method of using a credit card, a method of using an electronic money, a bank transfer, exchange of the merchandise article and the price, and deferred payment in the store or the like. Further, such a purchase and sale system includes a settlement system performing settlement of the purchased merchandise article.

Further, in recent years, information processing devices used by users have a so-called reader and/or writer function (based on non-contact communication) of performing information exchange to and from a data storage medium such as an IC (Integrated Circuit) card. By virtue of this, each user is allowed to perform payment in online shopping or the like, for example, by using such an IC card charged with electronic money or the like and such an information processing device having the non-contact communication function.

According to one mode of embodiment, the portable information processing device is a portable information processing device performing settlement processing concerning purchase of a merchandise article or a right in cooperation with a given server, comprising: a non-contact communication unit performing non-contact communication with a data storage medium; a data acquisition unit acquiring data stored in the data storage medium, through the non-contact communication unit as a part of the settlement processing; a settlement processing unit performing settlement based on the data acquired by the data acquisition unit, in cooperation with the server, as a part of the settlement processing; a detection unit detecting at least one of attitude, movement, and a placement state of the own device; and a restriction unit acquiring a detection result from the detection unit and then, when the detection result does not satisfy a given condition, restricting performing of at least a part of the settlement processing.

Further, an information processing method, by using a portable information processing device that includes a non-contact communication unit performing non-contact communication with a data storage medium and a detection unit detecting at least one of attitude, movement, and a placement state of the own device and that performs settlement processing concerning purchase of a merchandise article or a right in cooperation with a given server, comprises: a data acquisition step of acquiring data stored in the data storage medium, through the non-contact communication unit; a settlement performing step of performing settlement concerning the purchase in cooperation with a given server on the basis of the data acquired at the data acquisition step; and a restriction step of, when a detection result obtained by the detection unit does not satisfy a given condition, executing restriction processing of restricting at least a part of the settlement processing.

Further, another portable information processing device is a portable information processing device executing purchase processing of a merchandise article or a right on line in cooperation with a given server, comprising: a detection unit detecting attitude of the own device; a reader unit reading an IC card used for settlement, by non-contact communication; a data acquisition unit executing standby processing of waiting for the IC card to come near the reader unit and, when the IC card has become close in the standby processing, executing data acquisition processing of acquiring data of the IC card through the reader unit; and a restriction unit, during the execution of the standby processing performed by the data acquisition unit, performing determination by using a detection result obtained by the detection unit and then, when the attitude does not satisfy a given condition, terminating or stopping the standby processing.

Further, another portable information processing device may further comprise a purchase object specification processing unit, regardless of the attitude of the own device, executing specification processing for the purchase object on the basis of given user operation to the portable information processing device.

Further, another portable information processing device may further comprise a standby processing restart unit, when the standby processing have been terminated or stopped by the restriction unit, executing request processing of requesting a user to perform given operation to the portable information processing device and then executing the processing of, with adopting as a condition the sensing of the given operation, starting or restarting the standby processing.

Further, another portable information processing device may further comprise a communication unit performing communication with a given server and may comprise a transaction execution unit, after the data acquisition performed by the data acquisition unit, regardless of the attitude of the own device, performing communication with the server and thereby executing given transaction processing in the settlement processing on the basis of the acquired data.

Further, another portable information processing device is a portable information processing device executing purchase processing of a merchandise article or a right on line in cooperation with a given server, comprising: a detection unit detecting presence or absence of movement of the own device; a reader unit reading an IC card used for settlement, by non-contact communication; a data acquisition unit executing standby processing of waiting for the IC card to come near the reader unit and, when the IC card has become close in the standby processing, executing data acquisition processing of acquiring data of the IC card through the reader unit; and a restriction unit, during the execution of the standby processing performed by the data acquisition unit, performing determination by using a detection result obtained by the detection unit and then, in case of the presence of the movement, terminating or stopping the standby processing.

Further, another portable information processing device may further comprise a purchase object specification processing unit, regardless of the presence or absence of movement of the own device, executing specification processing for the purchase object on the basis of given user operation to the portable information processing device.

Further, another portable information processing device may further comprise a standby processing restart unit, when the standby processing have been terminated or stopped by the restriction unit, executing request processing of requesting a user to perform given operation to the portable information processing device and then executing the processing of, with adopting as a condition the sensing of the given operation, starting or restarting the standby processing.

Further, another portable information processing device may further comprise a communication unit performing communication with a given server and may comprise a transaction execution unit, after the data acquisition performed by the data acquisition unit, regardless of the presence or absence of movement of the own device, performing communication with the server and thereby executing given transaction processing in the settlement processing on the basis of the acquired data.

Further, another portable information processing device is a portable information processing device executing purchase processing (including non-settlement processing and settlement processing) of a merchandise article or a right, comprising: a detection unit detecting at least one of attitude, movement, and a placement state of the own device; a non-settlement processing unit performing the given non-settlement processing regardless of the attitude, the movement, and the placement state of the own device; a non-contact communication unit performing non-contact communication with a data storage medium; a data acquisition unit performing standby processing of waiting for the data storage medium to come near the non-contact communication unit and then, when the data storage medium has become close in the standby processing, executing data acquisition processing of acquiring data of the data storage medium through the non-contact communication unit; a restriction unit, when the detection result obtained by the detection unit does not satisfy a given condition in the standby processing performed by the data acquisition unit, terminating or stopping the standby processing; an operation sensing unit executing operation sensing processing of sensing given operation performed by a user; an operation request unit, when in the standby processing, a detection result obtained by the detection unit had not satisfied a given condition so that the restriction unit has terminated or stopped the standby processing, executing operation request processing of requesting a user to perform the given operation; and a standby processing restart unit executing the processing of restarting the standby processing in response to sensing of the given operation by the operation sensing unit.

Further, another portable information processing device is a portable information processing device performing settlement processing concerning purchase of a merchandise article or a right in cooperation with a given settlement server, comprising: a non-contact communication unit performing non-contact communication with a data storage medium; a data acquisition unit acquiring data stored in the data storage medium, through the non-contact communication unit as a part of the settlement processing; a transmission unit transmitting to the settlement server the data acquired by the data acquisition unit, as a part of the settlement processing; a detection unit detecting at least one of attitude, movement, and a placement state of the own device; and a restriction unit acquiring a detection result from the detection unit and then, when the detection result does not satisfy a given condition, restricting performing of at least a part of the settlement processing.

Further, another portable information processing device is a portable information processing device performing settlement processing concerning purchase of a merchandise article or a right, comprising: a non-contact communication unit performing non-contact communication; a control unit detecting a settlement-use IC card becoming close by using the non-contact communication unit and then performing non-contact communication with the IC card having become close; a detection unit detecting at least one of attitude, movement, and a placement state of the own device; and a restriction unit acquiring a detection result obtained by the detection unit and then, when the detection result does not satisfy a given condition, performing the processing of restricting execution of the control unit.

Further, another portable information processing device is a portable information processing device performing settlement processing concerning purchase of a merchandise article or a right in cooperation with a given server, comprising: a non-contact communication unit performing non-contact communication with a data storage medium; a data acquisition unit acquiring data stored in the data storage medium, through the non-contact communication unit as a part of the settlement processing; a settlement request transmission processing unit as a part of the settlement processing, transmitting a settlement request to the server in cooperation with the server on the basis of the data acquired by the data acquisition unit; a detection unit detecting at least one of attitude, movement, and a placement state of the own device; and a restriction unit acquiring a detection result from the detection unit and then, when the detection result does not satisfy a given condition, restricting performing of at least a part of the settlement processing.

The portable information processing device is a portable information processing device executing purchase processing of a merchandise article or a right on line in cooperation with a given server, comprising: a detection unit detecting attitude of the own device; a purchase object specification processing unit, regardless of the attitude of the own device, executing specification processing for the purchase object on the basis of given user operation to the portable information processing device; a reader unit reading an IC card by non-contact communication; a data acquisition unit executing standby processing of waiting for the IC card to come near the reader unit and, when the IC card has become close in the standby processing, executing data acquisition processing of acquiring data of the IC card through the reader unit; a restriction unit, during the execution of the standby processing performed by the data acquisition unit, performing determination by using a detection result obtained by the detection unit and then, when the attitude does not satisfy a given condition, terminating or stopping the standby processing; and a standby processing restart unit, when the standby processing have been terminated or stopped by the restriction unit, executing request processing of requesting a user to perform given operation to the portable information processing device and then executing the processing of, with adopting as a condition the sensing of the given operation, starting or restarting the standby processing.

Further, the portable information processing device further comprises a communication unit performing communication with a given settlement-related server and comprises a transaction execution unit, after the data acquisition performed by the data acquisition unit, regardless of the attitude of the own device, performing communication with the settlement-related server and thereby executing given transaction processing in the settlement processing on the basis of the acquired data.

Further, the portable information processing device is a portable information processing device executing purchase processing of a merchandise article or a right on line in cooperation with a given server, comprising: a detection unit detecting attitude of the own device; a reader unit reading an IC card by non-contact communication; a data acquisition unit executing standby processing of waiting for the IC card to come near the reader unit and, when the IC card has become close in the standby processing, executing data acquisition processing of acquiring data of the IC card through the reader unit; a restriction unit, during the execution of the standby processing performed by the data acquisition unit, performing determination by using a detection result obtained by the detection unit and then, when the attitude does not satisfy a given condition, terminating or stopping the standby processing; a standby processing restart unit, when the standby processing have been terminated or stopped by the restriction unit, executing request processing of requesting a user to perform given operation to the portable information processing device and then executing the processing of, with adopting as a condition the sensing of the given operation, starting or restarting the standby processing; a communication unit performing communication with a given settlement-related server; and a transaction execution unit, after the data acquisition performed by the data acquisition unit, regardless of the attitude of the own device, performing communication with the settlement-related server and thereby executing given transaction processing in the settlement processing on the basis of the acquired data.

Further, the portable information processing device is a portable information processing device executing purchase processing of a merchandise article or a right on line in cooperation with a given server, comprising: a detection unit detecting movement of the own device; a purchase object specification processing unit, regardless of the presence or absence of movement of the own device, executing specification processing for the purchase object on the basis of given user operation to the portable information processing device; a reader unit reading an NFC card by non-contact communication; a data acquisition unit executing standby processing of waiting for the NFC card to come near the reader unit and, when the NFC card has become close in the standby processing, executing data acquisition processing of acquiring data of the NFC card through the reader unit; a restriction unit, during the execution of the standby processing performed by the data acquisition unit, performing determination by using a detection result obtained by the detection unit and then, in case of the presence of movement in the own device, terminating or stopping the standby processing; and a standby processing restart unit, when the standby processing have been terminated or stopped by the restriction unit, executing request processing of requesting a user to perform given operation to the portable information processing device and then executing the processing of, with adopting as a condition the sensing of the given operation, starting or restarting the standby processing.

Further, the portable information processing device further comprises a communication unit performing communication with a given settlement-related server and comprises a transaction execution unit, after the data acquisition performed by the data acquisition unit, regardless of the presence or absence of movement of the own device, performing communication with the settlement-related server and thereby executing given transaction processing in the settlement processing on the basis of the acquired data.

Further, the portable information processing device is a portable information processing device executing purchase processing of a merchandise article or a right on line in cooperation with a given server, comprising: a detection unit detecting movement of the own device; a reader unit reading an NFC card by non-contact communication; a data acquisition unit executing standby processing of waiting for the NFC card to come near the reader unit and, when the NFC card has become close in the standby processing, executing data acquisition processing of acquiring data of the NFC card through the reader unit; a restriction unit, during the execution of the standby processing performed by the data acquisition unit, performing determination by using a detection result obtained by the detection unit and then, in case of the presence of movement in the own device, terminating or stopping the standby processing; a standby processing restart unit, when the standby processing have been terminated or stopped by the restriction unit, executing request processing of requesting a user to perform given operation to the portable information processing device and then executing the processing of, with adopting as a condition the sensing of the given operation, starting or restarting the standby processing; a communication unit performing communication with a given settlement-related server; and a transaction execution unit, after the data acquisition performed by the data acquisition unit, regardless of the presence or absence of movement of the own device, performing communication with the settlement-related server and thereby executing given transaction processing in the settlement processing on the basis of the acquired data.

Further, the recording medium storing an information processing program causes a portable information processing device that includes a detection unit detecting attitude of the own device, a reader unit reading an NFC card by non-contact communication, and a communication unit performing communication with a given server and that executes purchase processing of a merchandise article or a right on line in cooperation with a given server, to operate as: a purchase object specification processing unit, regardless of the attitude of the own device, executing specification processing for the purchase object on the basis of given user operation to the portable information processing device; a data acquisition unit executing standby processing of waiting for the NFC card to come near the reader unit and, when the NFC card has become close in the standby processing, executing data acquisition processing of acquiring data of the NFC card through the reader unit; a restriction unit, during the execution of the standby processing performed by the data acquisition unit, performing determination by using a detection result obtained by the detection unit and then, when the attitude does not satisfy a given condition, terminating or stopping the standby processing; a standby processing restart unit, when the standby processing has been terminated or stopped by the restriction unit, executing request processing of requesting a user to perform given operation to the portable information processing device and then executing the processing of, with adopting as a condition the sensing of the given operation, starting or restarting the standby processing; and a transaction execution unit, after the data acquisition performed by the data acquisition unit, regardless of the attitude of the own device, performing communication with the server and thereby executing given transaction processing in the settlement processing on the basis of the acquired data.

Further, the recording medium storing an information processing program causes a portable information processing device that includes a detection unit detecting movement of the own device, a reader unit reading an NFC card by non-contact communication, and a communication unit performing communication with a given server and that executes purchase processing of a merchandise article or a right on line in cooperation with a given server, to operate as: a purchase object specification processing unit, regardless of the presence or absence of movement of the own device, executing specification processing for the purchase object on the basis of given user operation to the portable information processing device; a data acquisition unit executing standby processing of waiting for the NFC card to come near the reader unit and, when the NFC card has become close in the standby processing, executing data acquisition processing of acquiring data of the NFC card through the reader unit; a restriction unit, during the execution of the standby processing performed by the data acquisition unit, performing determination by using a detection result obtained by the detection unit and then, in case of the presence of movement in the own device, terminating or stopping the standby processing; a standby processing restart unit, when the standby processing has been terminated or stopped by the restriction unit, executing request processing of requesting a user to perform given operation to the portable information processing device and then executing the processing of, with adopting as a condition the sensing of the given operation, starting or restarting the standby processing; and a transaction execution unit, after the data acquisition performed by the data acquisition unit, regardless of the presence or absence of movement of the own device, performing communication with the server and thereby executing given transaction processing in the settlement processing on the basis of the acquired data.

Further, the portable information processing device is a portable information processing device executing purchase processing of a merchandise article or aright, comprising: a detection unit detecting at least one of attitude, movement, and a placement state of the own device; anon-settlement processing unit performing the given non-settlement processing regardless of the attitude, the movement, and the placement state of the own device; a non-contact communication unit performing non-contact communication with a data storage medium; a data acquisition unit performing standby processing of waiting for the data storage medium to come near the non-contact communication unit and then, when the data storage medium has become close in the standby processing, executing data acquisition processing of acquiring data of the data storage medium through the non-contact communication unit; a restriction unit, when the detection result obtained by the detection unit does not satisfy a given condition in the standby processing performed by the data acquisition unit, terminating or stopping the standby processing; an operation sensing unit executing operation sensing processing of sensing given operation performed by a user; an operation request unit, when in the standby processing, a detection result obtained by the detection unit had not satisfied a given condition so that the restriction unit has terminated or stopped the standby processing, executing operation request processing of requesting a user to perform the given operation; a standby processing restart unit executing the processing of restarting the standby processing in response to sensing of the given operation by the operation sensing unit; a communication unit performing communication with a settlement server device through a network; and a settlement processing unit, after the data acquisition performed by the data acquisition unit, regardless of the attitude, the movement, and the placement state of the own device, performing communication with the settlement server device and thereby executing the settlement processing on the basis of the acquired data.

The object and advantages of the invention will be realized and attained by means of the elements and combinations particularly pointed out in the claims.

It is to be understood that both the foregoing general description and the following detailed description are exemplary and explanatory and are not restrictive of the invention.

These and other objects, features, aspects, and effects of the present technique will become clearer from the following detailed description with reference to the accompanying drawings.

BRIEF DESCRIPTION OF THE DRAWINGS

FIG. 4 is a schematic diagram illustrating an example of balance history information stored in a storage unit of an IC card.

FIG. 6 is a schematic diagram illustrating an example of sales history information stored in a storage unit by a sales server device.

FIG. 8 is a schematic diagram illustrating an example of settlement history information stored in a storage unit by a settlement server device.

FIG. 17 is a flow chart illustrating a procedure of processing performed by a portable information processing device according to modification 5.

FIG. 18 is a flow chart illustrating a procedure of communication distance restriction processing performed by a portable information processing device.

DETAILED DESCRIPTION OF NON-LIMITING EXAMPLE EMBODIMENTS

<System Outline>

Figure 1:
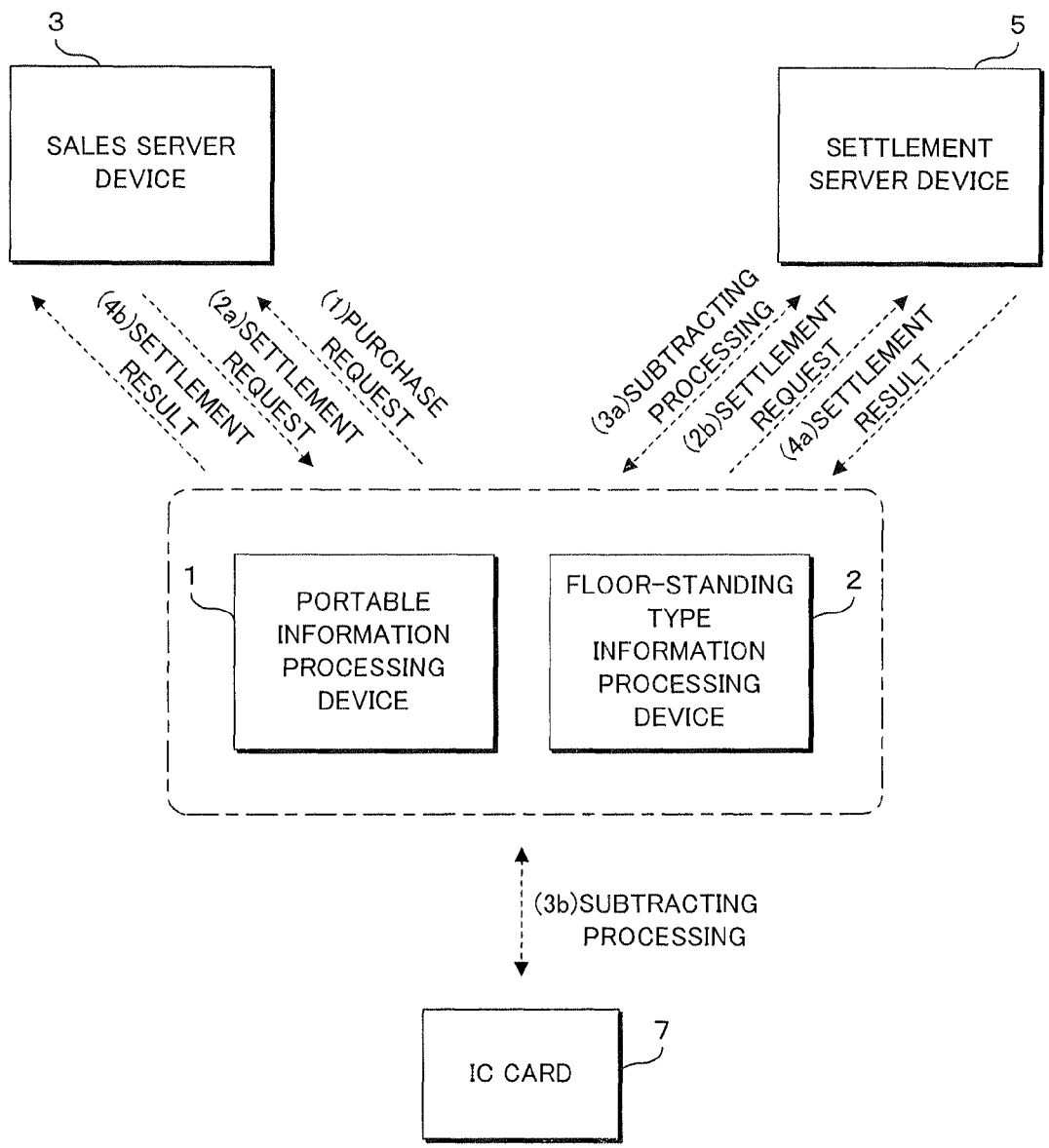
FIG. 1 is a schematic diagram for describing outlines of a purchase and sale system according to an embodiment.

FIG. 1 is a schematic diagram for describing outlines of a purchase and sale system according to the present embodiment. The purchase and sale system according to the present embodiment constructed from: one or a plurality of information processing devices like a portable information processing device 1 and a floor-standing type information processing device 2; and a sales server device 3 and a settlement server device 5. Here, the sales server device 3 and the settlement server device 5 may be constructed from a single server having both functions in a unified manner or, alternatively, may be constructed from separate servers. Further, each of the sales server device 3 and the settlement server device 5 may be constructed from a plurality of server devices. The portable information processing device 1 and the floor-standing type information processing device 2 are devices used by a user at the time of purchasing a merchandise article. For example, the portable information processing device 1 is a device such as a portable game device, a portable telephone, a smartphone, a tablet type terminal device, and a notebook computer. For example, the floor-standing type information processing device 2 is a device such as a floor-standing type game device, a desktop personal computer, and a tower type personal computer. The portable information processing device 1 and the floor-standing type information processing device 2 are allowed to perform communication with the sales server device 3 and the settlement server device 5 respectively through a network of cable or wireless. Further, the portable information processing device 1 and the floor-standing type information processing device 2 according to the present embodiment have a non-contact communication function and are allowed to perform communication with an IC card 7.

The purchase and sale system according to the present embodiment is a so-called online purchase and sale system in which the sales server device 3 sells a merchandise article, a right, or the like through a network and then a user purchases the merchandise article, the right, or the like by using the portable information processing device 1 or the floor-standing type information processing device 2. That is, the purchase and sale system according to the present embodiment is a system in which without a vendor and a purchaser (a consumer) facing each other, the consumer purchases an article or a service by using the portable information processing device 1 or the floor-standing type information processing device 2 through a network such as the Internet. Thus, the portable information processing device 1 and the floor-standing type information processing device 2 are devices of non-facing type rather than devices of store installation type. That is, the portable information processing device 1 and the floor-standing type information processing device 2 are devices operated by a purchaser of a merchandise article, a right, or the like rather than devices operated by a vendor of a merchandise article, a right, or the like.

For example, the merchandise article sold by the sales server device 3 may be an article of diverse kind such as a book and an electronic device to be delivered later to the home or the like of the user by mail or the like. Further, the merchandise article may be any service provided to a user who has purchased it. Further, the merchandise article may be a digital content such as software and data (including item data or the like usable only in the inside of particular software) purchased and downloaded to the portable information processing device 1, the floor-standing type information processing device 2, or another device. Alternatively, the merchandise article may be another thing of diverse kind.

For example, the right sold by the sales server device 3 is a right to use a virtual currency or the like in a service in which the server device mainly administers an increase, a decrease, or the like in numerical information (e.g., balance information) like in a virtual currency service or the like. For example, a virtual currency or a point used in a particular sales site, a game, or the like is imparted to the user by an amount corresponding to a counter value (e.g., the amount of user's payment) so that a right to use the virtual currency, the point, or the like is allowed to be sold to the user. Here, in the flowing description, a merchandise article or a right sold by the sales server device 3 is simply referred to as a merchandise article.

In a case that the merchandise article sold by the sales server device 3 is a digital content, the portable information processing device 1 and the floor-standing type information processing device 2 are allowed to download and use a purchased digital content. Such digital contents include a video artwork such as a movie and television broadcasting, a game, an application, a database, a web site, program software, text data, a comic, a music piece, an animation, a photograph, an artwork, a computer graphic, and a character image. For example, when a video artwork has been purchased as a digital content, the portable information processing device 1 or the floor-standing type information processing device 2 are allowed to download the video data of the video artwork from the sales server device 3 or another server device and then perform the processing of reproducing and displaying the video data on a display unit or the like. Here, such a digital content such as a video artwork or a music piece may be provided by so-called streaming distribution. Further, for example, when a game has been purchased as the digital content, the portable information processing device 1 or the floor-standing type information processing device 2 are allowed to download and execute the program, the data, and the like of the game. As such, the portable information processing device 1 and the floor-standing type information processing device 2 are allowed to perform the processing necessary for using the purchased digital content.

Further, for example, the merchandise article sold by the sales server device 3 may be premised to be a virtual currency. Such virtual currencies include: a point or a virtual coin allowed to be used for purchasing a merchandise article at a particular web site; and a point, a virtual coin, and the like allowed to be used for purchasing an item or an additional scenario in the inside of a particular game. The portable information processing device 1 and the floor-standing type information processing device 2 purchase a virtual currency at the sales server device 3 and then purchase a merchandise article by using the virtual currency at a particular web site or in the inside of a game.

Further, in the purchase and sale system according to the present embodiment, a user who is to purchase a merchandise article is allowed to use an IC card 7 for payment of the price. The user is allowed to charge electronic money, a point, or the like to be used for purchasing a merchandise article, in advance at a store or the like. The IC card 7 may be common to a card used for payment of fares in public transportation facilities such as electric train and bus. The IC card 7 stores in an internal memory or the like the balance of charged electronic money or point. The IC card 7 has a non-contact communication function and hence is allowed to perform settlement processing with the settlement server device 5 through the portable information processing device 1 or the floor-standing type information processing device 2.

The flowing description is given for a case that a user uses the portable information processing device 1. However, similar situation holds even in a case that the floor-standing type information processing device 2 is used. A user who uses online sales, first, operates the portable information processing device 1 so as to access the sales server device 3 and then performs login processing to the present system. As a result of the login processing, purchase and sale processing performed by the purchase and sale system according to the present embodiment (sales processing performed by the sales server device 3 and purchase processing performed by the portable information processing device 1) is started. When the login has succeeded, information concerning a list of for-sale merchandise articles and the like is transmitted from the sales server device 3 to the portable information processing device 1 and then the list of merchandise articles allowed to be purchased is displayed on a display unit of the portable information processing device 1. The user operates the portable information processing device 1 so as to select a merchandise article to be purchased (specification of a merchandise article to be purchased) and then provides a purchase request to the sales server device 3 (see (1) in the figure). That is, on the basis of the information acquired from the sales server device 3, the portable information processing device 1 executes the processing of displaying the merchandise article list on the display unit 13, then, on the basis of the operation information of an operation unit 14, executes the processing of determining which merchandise article has been selected, and then executes the processing of notifying the identification information of the selected merchandise article to the sales server device 3 and the processing of notifying the purchase request for the merchandise article to the sales server device 3. The sales server device 3 having received the purchase request from the portable information processing device 1 calculates the total price and the like of the merchandise articles of purchase objects, and then transmits a request for payment of this price, as a settlement request to the portable information processing device 1 (see (2a) in the figure). The portable information processing device 1 having received the settlement request from the sales server device 3 transmits the received settlement request to the settlement server device 5 (see (2b) in the figure).

The settlement server device 5 having received the settlement request from the portable information processing device 1 performs communication with the IC card 7 owned by the user through the portable information processing device 1 and thereby performs the processing of subtracting the amount of money corresponding to the merchandise price from the balance stored in the IC card 7 (see (3a) and (3b) in the figure). (Here, as described later, in a case that the balance is not stored in the IC card 7 and hence the balance is stored and administered in the settlement server device 5, in this example, the processing of subtraction from the balance in the IC card 7 is not performed and the processing of subtraction from the balance by the amount of money corresponding to the merchandise price is performed in the settlement server device 5.) At that time, the portable information processing device 1 displays on the display unit a message or the like prompting the user to bring the payment-use IC card 7 or the like close to a given part of the portable information processing device 1, and then performs non-contact communication with the IC card 7. The portable information processing device 1 transmits to the IC card 7 the information received from the settlement server device 5 and transmits to the settlement server device 5 the information received from the IC card 7. The communication between the settlement server device 5 and the IC card 7 through the portable information processing device 1 is performed by plural steps of transaction processing. By virtue of this, the merchandise price is subtracted from the balance in the IC card 7.

The settlement server device 5 having terminated the communication with the IC card 7 transmits the result of settlement processing to the portable information processing device 1 (see (4a) in the figure). When the merchandise price has successfully been subtracted from the balance in the IC card 7, a result indicating that the settlement processing has succeeded is transmitted. In contrast, when the merchandise price was not allowed to be subtracted by a reason that the balance was insufficient or alternatively that a problem had occurred in the communication, a result indicating that the settlement processing has failed is transmitted. The portable information processing device 1 having received the settlement result from the settlement server device 5 transmits the received settlement result to the sales server device 3 (see (4b) in the figure). At the timing of the transmission of the settlement result, the settlement processing performed by the purchase and sale system according to the present embodiment is terminated. On the basis of the settlement result received from the portable information processing device 1, the sales server device 3 performs further processing for selling the merchandise articles. For example, when the settlement processing has succeeded, the sales server device 3 determines that the price for the merchandise article of sales object has been paid, and hence advances the purchase and sale processing to the stage of: shipment preparation for the merchandise article; download permission; or the like. Further, for example, when the settlement processing has failed, the sales server device 3 notifies to the portable information processing device 1 that the settlement processing has failed, the settlement processing is to be performed again, or the like. Here, the purchase and sale processing performed by the purchase and sale system according to the present embodiment is terminated, for example, when the user logs out from the system.

As such, in the purchase and sale system according to the present embodiment, the sales server device 3 and the settlement server device 5 do not perform communication directly and performs communication through the portable information processing device 1. This avoids a possibility that a communication problem or the like between the sales server device 3 and the settlement server device 5 causes a failure in the purchase and sale processing, and hence smooth purchase and sale processing is allowed to be realized. However, this system configuration is an example and employable configurations are not limited to this. For example, a configuration may be employed that the sales server device 3 transmits a settlement request directly to the settlement server device 5, then the settlement server device 5 performs subtraction processing for the IC card 7 through the portable information processing device 1, and then the settlement server device 5 transmits a settlement result directly to the sales server device 3. Further, for example, a configuration may be employed that the settlement server device 5 performs subtraction processing for the IC card 7 through the sales server device 3 and the portable information processing device 1. The purchase and sale system may have a configuration other than these.

Further, in the purchase and sale system according to the present embodiment, a function of preventing unauthorized access (read/write or the like of data) to the IC card 7 is installed in the portable information processing device 1. Here, in the present embodiment, the unauthorized access prevention function is not installed in the floor-standing type information processing device 2. This is because the portable information processing device 1 is easy to be carried by a user and hence unauthorized use is easy to be performed in comparison with the floor-standing type information processing device 2. However, a configuration may be employed that a similar unauthorized access prevention function is installed also in the floor-standing type information processing device 2.

The unauthorized access prevention function provided in the portable information processing device 1 according to the present embodiment includes the followings three points.

(1) Restriction of the device attitude
(2) Restriction of the standby time in the communication with the IC card 7
(3) Restriction of the communication distance with the IC card 7

The unauthorized access prevention function according to the present embodiment is a function of preventing a situation that a malicious user performs unauthorized access to the IC card 7 of another person by using the portable information processing device 1. The above-described (1) is a function of restricting the attitude, the movement, or the placement state (simply referred to as the attitude, hereinafter) of the portable information processing device 1 at the time of performing access to the IC card 7. The portable information processing device 1 includes an acceleration sensor and the like and hence is allowed to detect the attitude of the own device. For example, in a case that the housing of the portable information processing device 1 has the shape of a substantially rectangular plate, access to the IC card 7 is permitted only when the housing is in a substantially horizontal state. By virtue of this, the attitude at the time that a malicious user is to perform unauthorized use of the portable information processing device 1 is allowed to be restricted so that unauthorized use is allowed to be suppressed.

The above-described (2) is a function of restricting the time for which the standby state is maintained, for example, after settlement processing is started by the portable information processing device 1 and then a message or the like prompting the user to bring the IC card 7 close to a given part is displayed on the display unit, until non-contact communication with the IC card 7 is started. In comparison with the floor-standing type information processing device 2 and a conventional portable information processing device not having an unauthorized access prevention function, in the portable information processing device 1 according to the present embodiment, the standby time is set up short. By virtue of this, the time that a malicious user performs unauthorized use of the portable information processing device 1 is allowed to be reduced so that unauthorized use is allowed to be suppressed.

The above-described (3) is a function of performing restriction such that the distance in which the portable information processing device 1 and the IC card 7 perform non-contact communication concerning the settlement processing is made short, for example, in comparison with a communication distance in a case that a game-use data storage medium having a non-contact communication function and the portable information processing device 1 perform non-contact communication. As a result of this function, for the purpose of settlement processing using the IC card 7, a necessity arises that the user brings the IC card 7 in contact with or extremely close to the portable information processing device 1. Thus, a situation is allowed to be suppressed that a malicious user performs unauthorized access to the IC card 7 or the like located at a distant place by using the portable information processing device 1.

The portable information processing device 1 according to the present embodiment performs restriction processing (1) to (3) given above and thereby restricts a situation that settlement processing is performed by unauthorized access to the IC card 7. Here, in the present invention, the "restriction processing of (the portable information processing device 1) restricting execution of at least a part of settlement processing" may be, for example, the following processing (a) to (d).

(a) Before settlement processing is executed, transition to the settlement processing is blocked so that execution of the settlement processing is prevented in advance. For example, in the processing of requesting the operation of confirming the merchandise article to be purchased, the processing of checking the detection result of the detection unit may be performed so that the confirmation operation for the merchandise article to be purchased may be not accepted. For example, processing that when, in response to a read command from the settlement server device 5, the portable information processing device 1 has gone into a standby state for non-contact communication for the purpose of non-contact communication with the IC card 7, the standby state is stopped (including suspension) or terminated so that transition to the subsequent settlement processing is blocked may be included in the processing (a).

(b) Processing that the processing of checking the detection result of the detection unit during the execution of settlement processing is executed so that the settlement processing is stopped (including suspension) or terminated and thereby the settlement processing is restricted. For example, in the processing of requesting the operation of selecting a payment method, the processing of checking the detection result of the detection unit may be performed so that the selection operation for the payment method may be not accepted.

(c) The processing of checking the detection result of the detection unit during the execution of settlement processing is executed so that the settlement processing is stopped or terminated and thereby the settlement processing is restricted. For example, during the execution of read processing for the IC card and/or during the communication for settlement with the settlement server, the processing of checking the detection result of the detection unit is performed so that the settlement processing is stopped or terminated and thereby the settlement processing is restricted.

(d) Processing that after the settlement processing has been terminated, the settlement processing is canceled so that the settlement processing is restricted.

Further, in addition to these, in a case that after a part of settlement processing has been performed in the portable information processing device 1, another one part of the settlement processing is executed further in the settlement server device 5 or in another device intervening the communication between the settlement server device 5 and the portable information processing device 1 (referred to as "in the settlement server device 5 or the like", hereinafter), the processing that for the purpose of blocking the execution of the another one part of the settlement processing in the settlement server device 5 or the like or for the purpose of providing a trigger for the blocking to the settlement server device or the like, information, a command, or the like is transmitted from the portable information processing device 1 to the settlement server device 5 or the like is also included in the above-described "restriction processing of restricting settlement in settlement processing". However, the restriction processing given above is an example and employable configurations are not limited to these. That is, the settlement processing may be restricted by a method other than these. (It is sufficient that processing that blocks settlement in the settlement processing is performed.)

<Device Configuration>

Figure 2:
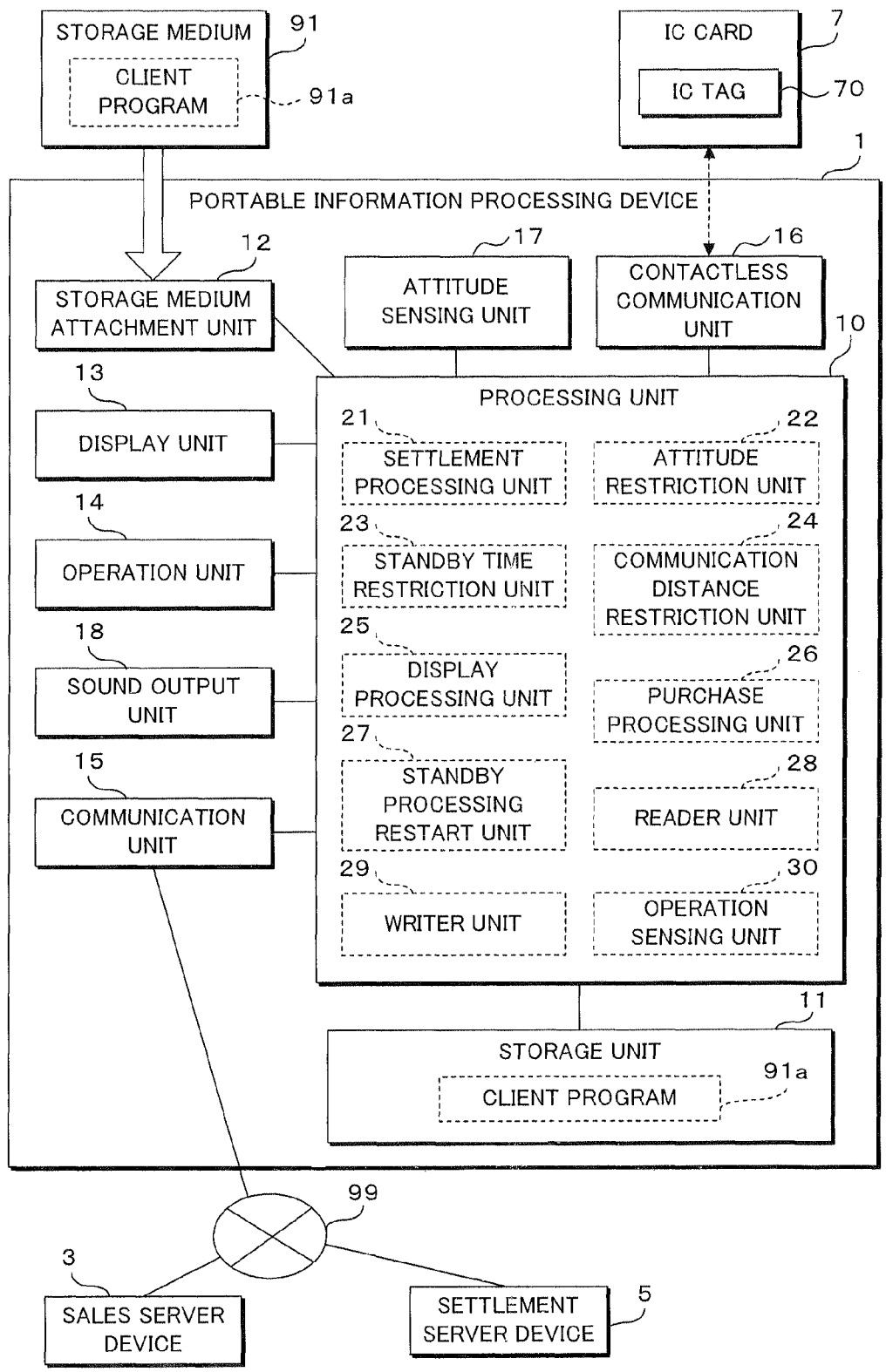
FIG. 2 is a block diagram illustrating a configuration of a portable information processing device.

FIG. 2 is a block diagram illustrating the configuration of the portable information processing device 1. The portable information processing device 1 according to the present embodiment is constructed from a processing unit (a processor) 10, a storage unit 11, a storage medium attachment unit 12, a display unit 13, an operation unit 14, a communication unit 15, a non-contact communication unit 16, an attitude sensing unit 17, a sound output unit 18, and the like. The processing unit 10 of the portable information processing device 1 is constructed from an arithmetic processing device such as a CPU (Central Processing Unit). The processing unit 10 reads and executes a client program 91*a* stored in a storage medium 91 attached to the storage medium attachment unit 12 or, alternatively, a client program 91*a* stored in the storage unit 11 and thereby performs various kinds of information processing concerning the purchase, the settlement, and the like of a merchandise article.

The storage unit 11 is constructed from a volatile or nonvolatile semiconductor memory device, a hard disk drive, or the like. The storage unit 11 stores various programs such as the client program 91*a* and data necessary for execution of the program. Further, the storage unit 11 is allowed to store a digital content purchased at the sales server device 3. The storage medium attachment unit 12 is constructed such that the storage medium 91 of card type, cassette type, disk type, or the like is allowed to be attached and detached. The processing unit 10 is allowed to read the client program 91*a* and the various kinds of data from the storage medium 91 attached to the storage medium attachment unit 12. Further, a configuration may be employed that the processing unit 10 is allowed to write a program, data, or the like into the storage medium 91.

The display unit 13 is constructed from a liquid crystal panel or the like and displays an image provided from the processing unit 10. The operation unit 14 is constructed from push buttons, a touch panel provided in the display unit 13, or the like and provides to the processing unit 10 a signal corresponding to the contents of operation performed by the user (e.g., push or release of a button). The communication unit 15 transmits and receives information to and from the sales server device 3, the settlement server device 5, another server device, another portable information processing device 1, or the like through the network 99 using radio signals such as a wireless LAN (Local Area Network) and a portable telephone communication network. For example, the portable information processing device 1 is allowed to perform communication with the server device through the communication unit 15 so as to download the client program 91*a* and the like and then store them into the storage unit 11.

The non-contact communication unit 16 employs a technique of so-called Near Field Communication (NFC) and performs non-contact data transmission and reception with the IC card 7 or the like by wireless. (Here, the "IC card" includes also a so-called "NFC card".) Typically, the communication distance of the non-contact communication unit 16 is several mm to several cm or the like. When the user brings the IC card 7 close within the communication distance of the non-contact communication unit 16, non-contact communication between the portable information processing device 1 and the IC card 7 is performed. The non-contact communication unit 16 transmits to an IC tag 70 built in the IC card 7 a signal instructing read of stored data and then, in response to this, receives desired data. The non-contact communication unit 16 has the function of a so-called IC tag reader. Further, the non-contact communication unit 16 is allowed to write data into the IC tag 70 by transmitting a write-instructing signal together with to-be-written data. That is, the non-contact communication unit 16 has the function of an IC tag writer. Further, the non-contact communication unit 16 has a function of so-called polling in which when an instruction of performing non-contact communication with the IC card 7 is received from the processing unit 10, transmission of a radio signal is repeated periodically until a response from the IC card 7 is obtained.

Here, employable methods of communication through the non-contact communication unit 16 are not limited to the NFC. That is, various communication methods such as RFID used as non-contact communication or short-distance wireless communication may be employed. Further, the communication unit 15 and the non-contact communication unit 16 both perform communication using radio signals. However, the employed radio signals are different from each other in, the frequency, the communication protocol, and the like. Then, the communication distance of the communication unit 15 is substantially longer than the communication distance of the non-contact communication unit 16.

The attitude sensing unit 17 senses the attitude of the portable information processing device 1 and then notifies the sensing result to the processing unit 10. The attitude sensing unit 17 is constructed from an acceleration sensor, a gyro sensor, a magnetic sensor, or the like. For example, by using an acceleration sensor sensing the acceleration in three-axial directions, the attitude sensing unit 17 senses the gravitational acceleration in the stationary state of the portable information processing device 1. By virtue of this, from the sensing result of the acceleration sensor (such as the orientation of the gravitational acceleration), the processing unit 10 is allowed to calculate the magnitude of inclination of the portable information processing device 1 relative to the vertical direction. Further, when the portable information processing device 1 is in a moving state, the acceleration sensor senses the acceleration corresponding to the movement. Thus, the attitude sensing unit 17 is allowed to calculate the movement speed, the moving direction, the position, and the like of the portable information processing device 1. Further, for example, when the attitude sensing unit 17 includes a gyro sensor, when the time integral value (i.e., the rotation angle) of the angular velocity sensed by the gyro sensor is calculated, the inclination, the position, and the like of the portable information processing device 1 are allowed to be calculated. However, employable sensing methods for the attitude of the portable information processing device 1 are not limited to this. That is, various methods may be employed. Here, in the description of the present embodiment, the inclination, the position, the orientation, or the like of the portable information processing device 1 obtained from the sensing result of the attitude sensing unit 17 is referred to as the attitude.

Further, for example, the attitude sensing unit 17 may have a configuration that image pickup is performed on the surroundings of the portable information processing device 1 by using a camera, an image sensor, or the like and then, on the basis of the image obtained by the image pickup, the attitude of the portable information processing device 1 is determined. In the determination based on the pick-up image, for example, when the presence of a desktop, a floor, or the like contained in the pick-up image is detected, for example, whether the portable information processing device 1 is being placed on a plane like on a desk top and on a floor is allowed to be determined. Further, in the attitude sensing unit 17, also when whether an object (such as a desktop and a floor) has become close to the portable information processing device 1 is detected by using a so-called proximity sensor or the like, for example, whether the portable information processing device 1 is being placed on a plane like on a desk top and on a floor is allowed to be determined. For example, such proximity sensors includes: a proximity sensor of electrostatic capacitance type utilizing the detection of a change in the electrostatic capacitance of a capacitor caused by an object becoming close; a proximity sensor of ultrasonic type detecting whether an object has become close; a proximity sensor of infrared type in which an infrared ray is projected from a light emitting element, then the infrared ray reflected and returned to a light receiving element is sensed and converted into an electric power, and then, when the converted electric power becomes a fixed value or higher, an object is determined as having become close within a fixed distance. The attitude sensed by the attitude sensing unit 17 may include the placement state based on such determination.

The sound output unit 18 is a so-called speaker or the like and outputs a music piece, a voice message, or the like in association with the information processing performed by the portable information processing device 1.

Further, in the portable information processing device 1 according to the present embodiment, when the processing unit 10 executes the client program 91*a*, a settlement processing unit 21, an attitude restriction unit 22, a standby time restriction unit 23, a communication distance restriction unit 24, a display processing unit 25, a purchase processing unit 26, a standby processing restart unit 27, a reader unit 28, a writer unit 29, an operation sensing unit 30, and the like are realized as software-based functional blocks in the processing unit 10. In the payment of the counter value of a purchased merchandise article, the settlement processing unit 21 relays information exchange between the sales server device 3, the settlement server device 5, and the IC card 7 and thereby performs settlement processing. For example, on the basis of a settlement request from the sales server device 3, the settlement processing unit 21 performs the processing of transmitting a settlement request to the settlement server device 5. For example, in accordance with a request from the settlement server device 5, the settlement processing unit 21 performs non-contact communication with the IC card 7 and performs subtraction processing for the electronic money or the like charged in the IC card 7. That is, the settlement processing unit 21 executes at least data acquisition processing of acquiring data stored in the IC card 7 and settlement execution processing of executing the settlement corresponding to the acquired data. Further, the data acquisition processing includes: standby processing of waiting for the IC card 7 to come near the non-contact communication unit 16; and read processing of, when the IC card 7 has become close in the standby processing, reading the data of the IC card 7 through the non-contact communication unit 16. Further, for example, on the basis of a settlement result from the settlement server device 5, the settlement processing unit 21 performs the processing of notifying the settlement result to the sales server device 3. Here, in the present embodiment, the settlement execution processing is the processing of subtracting the merchandise price from the balance data stored in the IC card 7. However, the settlement execution processing performed by the settlement execution unit is not limited to this. That is, the processing of subtraction from the balance data of each IC card 7 stored in a given server may be employed. Alternatively, the processing of generating billing information for credit payment related to the IC card 7 may be employed. As such, all kinds of processing of charging the owner of the IC card 7 for money payment are included. Further, in the present embodiment, the settlement execution processing is performed in cooperation with the portable information processing device 1 and the settlement server device 5. However, a case is also included that the settlement server device 5 leads the processing and the portable information processing device 1 simply follows the processing (Instead, the portable information processing device 1 may lead the processing).

On the basis of the attitude of the portable information processing device 1 sensed by the attitude sensing unit 17, the attitude restriction unit 22 restricts the settlement processing performed by the settlement processing unit 21. When the portable information processing device 1 is in a substantially horizontal state, the attitude restriction unit 22 in the present embodiment permits non-contact communication with the IC card 7 through the non-contact communication unit 16 and, in a case of not being in a substantially horizontal state, does not permit non-contact communication. The standby time restriction unit 23 restricts the standby time concerning the settlement processing performed by the settlement processing unit 21. In the present embodiment, when the standby time until non-contact communication with the IC card 7 is performed has exceeded a given time, the standby time restriction unit 23 suspends the settlement processing performed by the settlement processing unit 21. The communication distance restriction unit 24 performs the processing of restricting the distance in which non-contact communication with the IC card 7 through the non-contact communication unit 16 is allowed to be performed.

In accordance with the processing performed by the processing unit 10, the display processing unit 25 generates various images such as a menu screen and a settlement processing screen and then provides the generated image to the display unit 13 so as to display the image on the display unit 13. The purchase processing unit 26 performs the processing necessary for purchasing a merchandise article sold by the sales server device 3. For example, the purchase processing unit 26 performs; list display or detailed information display for the merchandise articles for sale; the processing of receiving selection of a merchandise article to be purchased from the user; the processing of transmitting the purchase request to the sales server device 3; and the processing of, after the settlement processing has succeeded, downloading the digital content.

When the processing of the non-contact communication unit 16 waiting for non-contact communication with the IC card 7 is suspended by any reason, the standby processing restart unit 27 performs the processing of restarting the suspended standby processing.

The reader unit 28 performs the processing of reading data from the IC card 7 by non-contact communication through the non-contact communication unit 16. That is, the reader unit 28 realizes the function of a reader for the IC card 7. Further, the writer unit 29 performs the processing of writing data into the IC card 7 by non-contact communication through the non-contact communication unit 16. That is, the writer unit 29 realizes the function of a writer for the IC card 7. Here, as for the reader unit 28 and the writer unit 29, the functions of both the reader and the writer may be realized in the non-contact communication unit 16 or, alternatively, one of the functions of the reader and the writer may be realized alone.

The operation sensing unit 30 performs the processing of sensing a situation that given operation has been performed to a push button, the touch panel, or the like of the operation unit 14 by the user.

In the present embodiment, the purchase processing performed by the portable information processing device 1 is a broad concept including the settlement processing performed by the settlement processing unit 21 described above. In the present embodiment, for convenience, it is premised that the portion of processing concerning the settlement extracted from the entire purchase processing is performed by the settlement processing unit 21 and that the other processing (the non-settlement processing) is performed by the purchase processing unit 26. However, this is an example and the settlement processing unit 21 and the purchase processing unit 26 may be unified as one processing unit.

Here, as for the configuration of the floor-standing type information processing device 2, a block diagram is not illustrated and detailed description is not provided. The floor-standing type information processing device 2 has substantially the same configuration as the portable information processing device 1. However, the display unit 13 is not provided and hence an image signal is outputted to a separate television device or the like so that image display is performed. Further, in place of a configuration that the operation unit 14 is provided in the main body of the floor-standing type information processing device 2, a configuration of being provided in a separate device such a controller may be employed. The non-contact communication unit 16 may be provided in the main body of the floor-standing type information processing device 2 or, alternatively, may be provided in a separate device such as a controller. Alternatively, a configuration may be employed that a dedicated device performing non-contact communication is connected to the floor-standing type information processing device 2. In the present embodiment, in the floor-standing type information processing device 2 may be not provided with the attitude sensing unit 17, the attitude restriction unit 22, and the standby time restriction unit 23.

Figure 3:
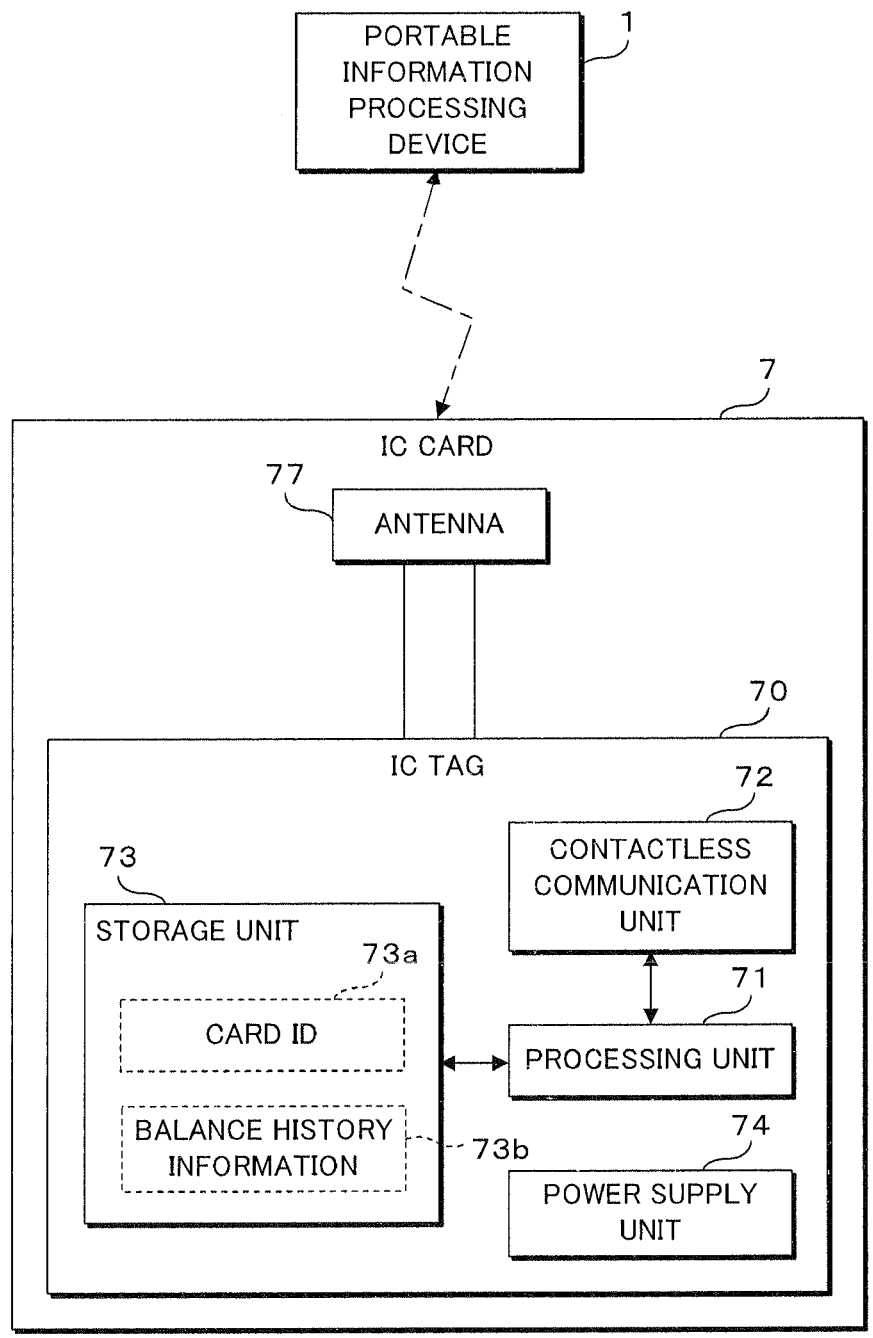
FIG. 3 is a block diagram illustrating a configuration of an IC card.

FIG. 3 is a block diagram illustrating the configuration of the IC card 7. The IC card 7 according to the present embodiment is a storage medium having a configuration that an IC tag 70 and an antenna 77 are embedded in the inside of a card member fabricated from synthetic resin, paper, or the like. The IC card 7 stores information concerning the balance of electronic money, a point, or the like and is used for payment for a merchandise price in online sales or the like. The antenna 77 of the IC card 7 may have a configuration that, for example, a metal wire is arranged spirally in the inside of the IC card 7 and then both ends thereof are connected to the IC tag 70. The IC tag 70 is provided as one IC chip and the inside thereof is provided with a processing unit 71, a non-contact communication unit 72, a storage unit 73, a power supply unit 74, and the like.

The IC tag 70 does not include a power supply such as a battery and operates by means of an electromotive force generated by electromagnetic induction or the like caused when the antenna 77 receives a radio signal from the portable information processing device 1. The IC tag 70 is a tag of so-called passive type. On the basis of the electromotive force, the power supply unit 74 supplies electric power to the processing unit 71, the non-contact communication unit 72, the storage unit 73, and the like in the inside of the IC tag 70 so that each part operates. Here, in the present embodiment, the IC tag 70 has been premised to be of a passive type. However, an active type may be employed that includes a power supply such as a battery provided in the inside of the IC tag 70.

The non-contact communication unit 72 of the IC tag 70 receives through the antenna 77 a signal transmitted from the portable information processing device 1 and then provides data concerning the received signal to the processing unit 71 and, at the same time, transmits through the antenna 77 to the portable information processing device 1 the data provided from the processing unit 71. The storage unit 73 is constructed from a data-rewritable volatile or nonvolatile memory device. The storage unit 73 stores: a card ID (IDentifier) 73*a* imparted individually to the IC tag 70 and different for each IC card; balance history information 73*b* which is a change history of the balance of electronic money or a point; and the like. In accordance with the data provided from the non-contact communication unit 72, the processing unit 71 reads data from the storage unit 73 and then provides the read data to the non-contact communication unit 72 such that the data is transmitted to the portable information processing device 1. Further, in accordance with the data provided from the non-contact communication unit 72, the processing unit 71 writes data into the storage unit 73.

FIG. 4 is a schematic diagram illustrating an example of the balance history information 73*b* stored in the storage unit 73 of the IC card 7. The balance history information 73*b* in the present example stores an update date, a balance, and an update ID in a manner of being related to each other. The update date is a date and time when the balance in the IC card 7 has been updated. The balance is the amount of electronic money, a point, or the like charged in the IC card 7 at the time of have been updated. The update ID is identification information imparted to the update processing for the balance in the IC card 7 and is imparted by the settlement server device 5. As for the balance history allowed to be stored in to the storage unit 73, the number of entries allowed to be stored is set forth like as 10 entries and 100 entries in accordance with the storage capacity of the storage unit 73. When update is to be performed exceeding the number of entries allowed to be stored, an entry having the oldest update date is deleted and then information concerning the new update is added. Here, the history stored in the balance history information 73*b* may be the value of the amount of money itself or, alternatively, may be a change in the amount of money (i.e., the value of increase or decrease).

Figure 5:
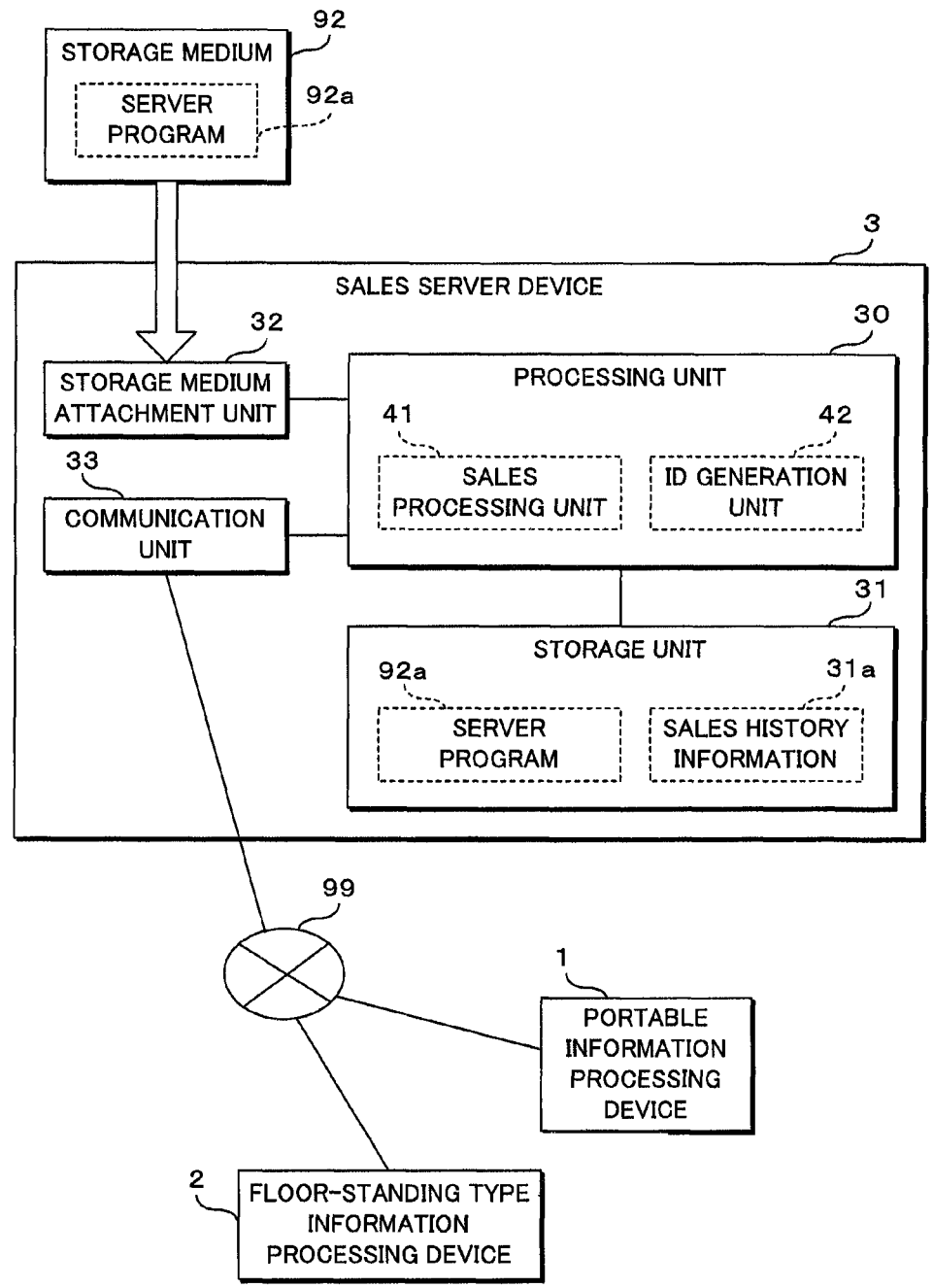
FIG. 5 is a block diagram illustrating a configuration of a sales server device.

FIG. 5 is a block diagram illustrating the configuration of the sales server device 3. The sales server device 3 according to the present embodiment is constructed from a processing unit (a processor) 30, a storage unit 31, a storage medium attachment unit 32, a communication unit 33, and the like. The processing unit 30 is constructed from an arithmetic processing, device such as a CPU and reads and executes a server program 92a stored in the storage unit 31 so as to perform various kinds of processing concerning the sales of a merchandise article. The storage unit 31 is constructed from a nonvolatile storage device and is allowed to store programs such as the server program 92a and various kinds of data. In the present embodiment, the storage unit 31 stores the history concerning the sales processing for the merchandise article as the sales history information 31a.

The storage medium attachment unit 32 is constructed such that a storage medium 92 of disk shape or the like is allowed to be attached and detached. The processing unit 30 is allowed to read the server program 92a and other various kinds of data from the storage medium 92 attached to the storage medium attachment unit 32 and then install them into the storage unit 31. The communication unit 33 transmits and receives data to and from the portable information processing device 1 or the floor-standing type information processing device 2 through the network 99 such as the Internet. Here, in the present embodiment, the sales server device 3 does not perform communication with the settlement server device 5.

Further, in the sales server device 3 according to the present embodiment, the processing unit 30 executes the server program 92a so that a sales processing unit 41, an ID generation unit 42, and the like are realized as software-based functional blocks. The sales processing unit 41 performs: the processing of transmitting information concerning a list of for-sale merchandise articles and the like to the portable information processing device 1 or the floor-standing type information processing device 2; the processing of receiving a purchase request for a merchandise article from the portable information processing device 1 or the floor-standing type information processing device 2; the processing of transmitting a settlement request concerning a requested merchandise article to the portable information processing device 1 or the floor-standing type information processing device 2; the processing of receiving the result of settlement processing from the portable information processing device 1 or the floor-standing type information processing device 2; the processing of selling the merchandise article in accordance with the result of settlement processing; and the like.

When a purchase request has been received from the portable information processing device 1 or the floor-standing type information processing device 2, the ID generation unit 42 generates identification information corresponding to a series of processing consisting of sales processing, settlement processing, and the like related to the merchandise article whose, purchase has been requested. In the present embodiment, this identification information is referred to as a transaction ID. For example, the ID generation unit 42 may generate a random numerical value and then adopt this as the transaction ID, alternatively may adopt a serial number or the like as the transaction ID, or alternatively may generate the transaction ID by a method other than these. The transaction ID generated by the ID generation unit 42 is attached to the settlement request transmitted from the sales processing unit 41 to the portable information processing device 1 or the floor-standing type information processing device 2. By using the transaction ID, the sales server device 3 administers the state of advancement or the like of the sales processing for the merchandise article.

FIG. 6 is a schematic diagram illustrating an example of the sales history information 31a stored in the storage unit 31 by the sales server device 3. The sales history information 31a stores information such as a user ID, for-sale merchandise information, a total price, a settlement request date and time, a settlement result, and a sales processing status in a manner of being related to the transaction ID. The user ID is identification information imparted to a user who purchases a merchandise article by using the portable information processing device 1 or the floor-standing type information processing device 2, and is inputted by the user through the portable information processing device 1 or the floor-standing type information processing device 2 when login processing to the present system is performed. The for-sale merchandise information is information concerning the sold merchandise article (whose purchase has been requested by the user) and includes, for example, the information of the trade name, the merchandise article number, or the like and the information of the number or the amount of the sold pieces. Total price is numerical information which indicating the total price of the sold merchandise articles. The settlement request date and time is the date and time when the settlement request concerning this transaction ID has been transmitted to the portable information processing device 1 or the floor-standing type information processing device 2.

The settlement result is information indicating the result of settlement for a settlement request, received from the portable information processing device 1 or the floor-standing type information processing device 2, and is any one of completed settlement, failed settlement, incomplete processing, and no receiving. The completed settlement is a state that a situation that the settlement processing performed by the settlement server device 5 has been terminated normally has been confirmed. The failed settlement is a state that a situation that the settlement processing has not normally terminated because of an insufficient balance in the IC card 7 or the like has been confirmed. The incomplete processing is a state that whether write of information into the IC card 7 has been terminated normally is indefinite. The no receiving is a state that a situation that a settlement result has not been received from the portable information processing device 1 or the floor-standing type information processing device 2. The sales processing status is a flag indicating whether the sales processing for the merchandise article concerning the transaction ID has been completed. Here, the configuration of the sales history information 31a illustrated in FIG. 6 is an example and employable configurations are not limited to this.

Figure 7:
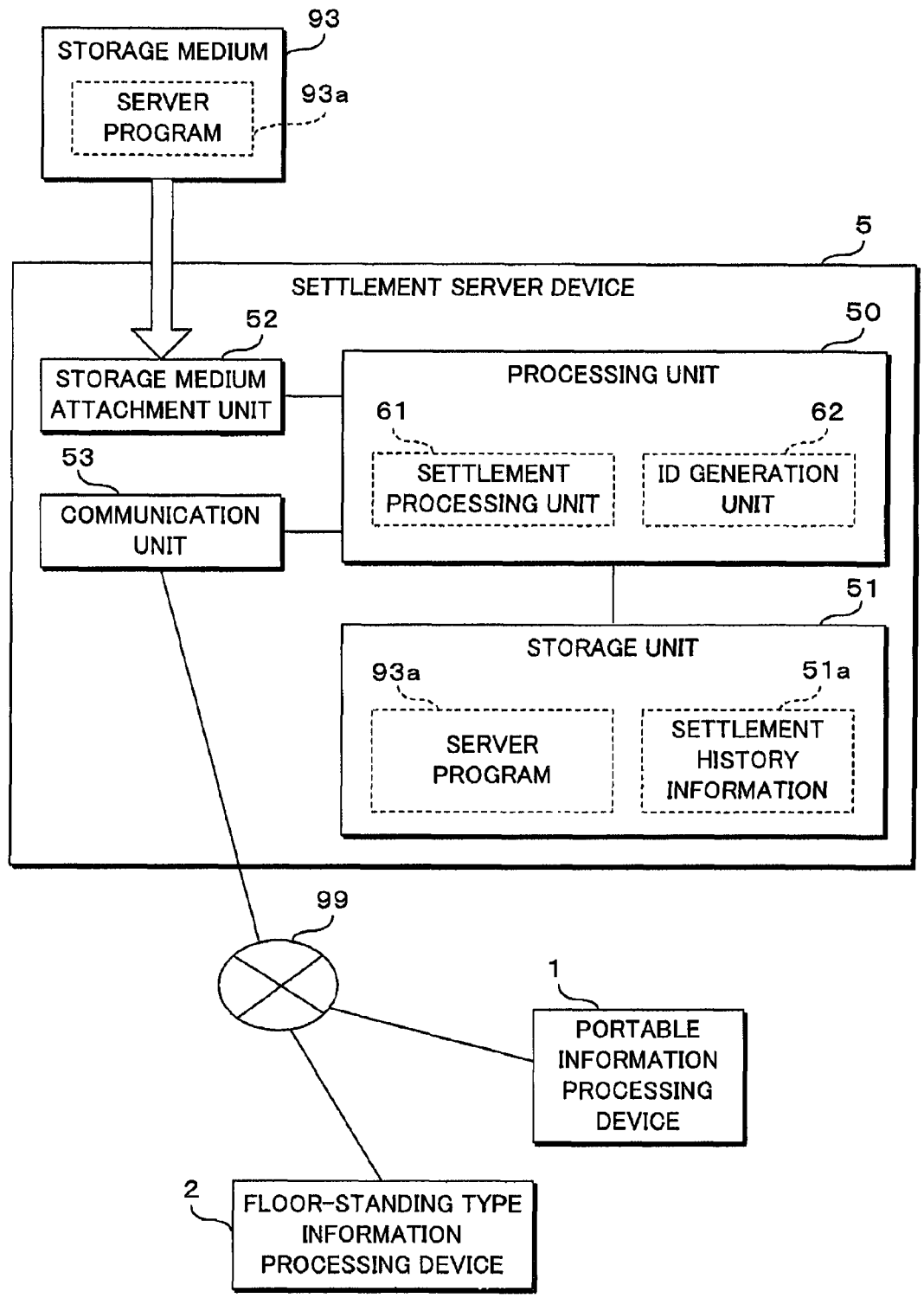
FIG. 7 is a block diagram illustrating a configuration of a settlement server device.

FIG. 7 is a block diagram illustrating the configuration of the settlement server device 5. The settlement server device 5 according to the present embodiment is constructed from a processing unit (a processor) 50, a storage unit 51, a storage medium attachment unit 52, a communication unit 53, and the like. The processing unit 50 is constructed from an arithmetic processing device such as a CPU and reads and executes a server program 93a stored in the storage unit 51 so as to perform the above-described processing concerning the settlement. The storage unit 51 is constructed from a nonvolatile storage device and is allowed to store programs such as the server program 93a and various kinds of data. In the present embodiment, the storage unit 51 stores the history concerning the settlement processing as settlement history information 51*a*.

The storage medium attachment unit 52 is constructed such that a storage medium 93 of disk shape or the like is allowed to be attached and detached. The processing unit 50 is allowed to read the server program 93*a* and other various kinds of data from the storage medium 93 attached to the storage medium attachment unit 52 and then install them into the storage unit 51. The communication unit 53 transmits and receives data to and from the portable information processing device 1 or the floor-standing type information processing device 2 through the network 99 such as the Internet. Here, in the present embodiment, the settlement server device 5 does not perform communication with the sales server device 3.

Further, in the settlement server device 5 according to the present embodiment, the processing unit 50 executes the server program 93*a* so that a settlement processing unit 61, an ID generation unit 62, and the like are realized as software-based functional blocks. On the basis of the settlement request provided from the portable information processing device 1 or the floor-standing type information processing device 2, the settlement processing unit 61 performs the processing of subtracting the merchandise price from the balance in the IC card 7. At that time, the settlement processing unit 61 performs plural times of information exchange with the IC card 7 through the portable information processing device 1 or the floor-standing type information processing device 2 so as to update the balance in the IC card 7.

When a settlement request has been received from the portable information processing device 1 or the floor-standing type information processing device 2, the ID generation unit 62 generates identification information to a series of settlement processing performed with the IC card 7. In the present embodiment, this identification information is referred to as an update ID. For example, the ID generation unit 62 may generate a random numerical value and then adopt this as the update ID, alternatively may adopt a serial number or the like as the update ID, or alternatively may generate the update ID by a method other than these.

Further, the settlement processing unit 61 performs the processing of storing the history concerning settlement processing into the storage unit 51 as the settlement history information 51*a*. At that time, the settlement processing unit 61 stores the history of settlement processing in a manner of being related to the transaction ID. FIG. 8 is a schematic diagram illustrating an example of the settlement history information 51*a* stored in the storage unit 51 by the settlement server device 5. The settlement history information 51*a* information such as a settlement status, a card ID, an update ID, and a settlement date and time in a manner of being related to the transaction ID.

The settlement status is information indicating the state of advancement of settlement processing and is, in the present embodiment, any one of three states of unfinished settlement, incomplete processing, and finished settlement. The unfinished settlement is a state between receiving of a settlement request from the portable information processing device 1 or the floor-standing type information processing device 2 and execution of a data write command to the IC card 7. The incomplete processing is a state that a data write command to the IC card 7 has been provided but a response is not yet obtained and hence whether write operation has been performed normally is unknown. The finished settlement is a state that write operation of data into the IC card 7 has been finished normally.

The card ID of the settlement history information 51*a* is stored in the IC card 7 used for the settlement processing by the user. At the first time of communication with the IC card 7 performed through the portable information processing device 1 or the floor-standing type information processing device 2, the settlement processing unit 61 is allowed to acquire the card ID of the IC card 7. The update ID is identification information imparted to the update processing for the balance in the IC card 7 and is an ID generated by the ID generation unit 62. The update ID is stored also in the balance history information 73*b* in the IC card 7. The settlement date and time is the date and time when the settlement processing was started and the date and time when the settlement request was received from the portable information processing device 1 or the floor-standing type information processing device 2.

When a settlement request has been received from the sales server device 3 through the portable information processing device 1 or the floor-standing type information processing device 2, the settlement processing unit 61 of the settlement server device 5 adds information concerning the transaction ID imparted to the received settlement request, to the settlement history information 51*a* of the storage unit 51. Further, the ID generation unit 62 generates an update ID and then the settlement processing unit 61 adds the generated update ID to the settlement history information 51*a*. In the information added to the settlement history information 51*a* at that time, the settlement status is unfinished settlement, the card ID is unknown, and the settlement date and time is equal to the date and time of receiving the settlement request. After that, when the card ID is obtained from the IC card 7 through the portable information processing device 1 or the floor-standing type information processing device 2, the settlement processing unit 61 stores this into the settlement history information 51*a*. Further, when a data write command to the IC card 7 has been provided, the settlement processing unit 61 changes the settlement status into incomplete processing and, when a response of writing completion has been obtained from the IC card 7, changes the settlement status into finished settlement.

<Outlines of Purchase and Sale Processing>

Figure 9:
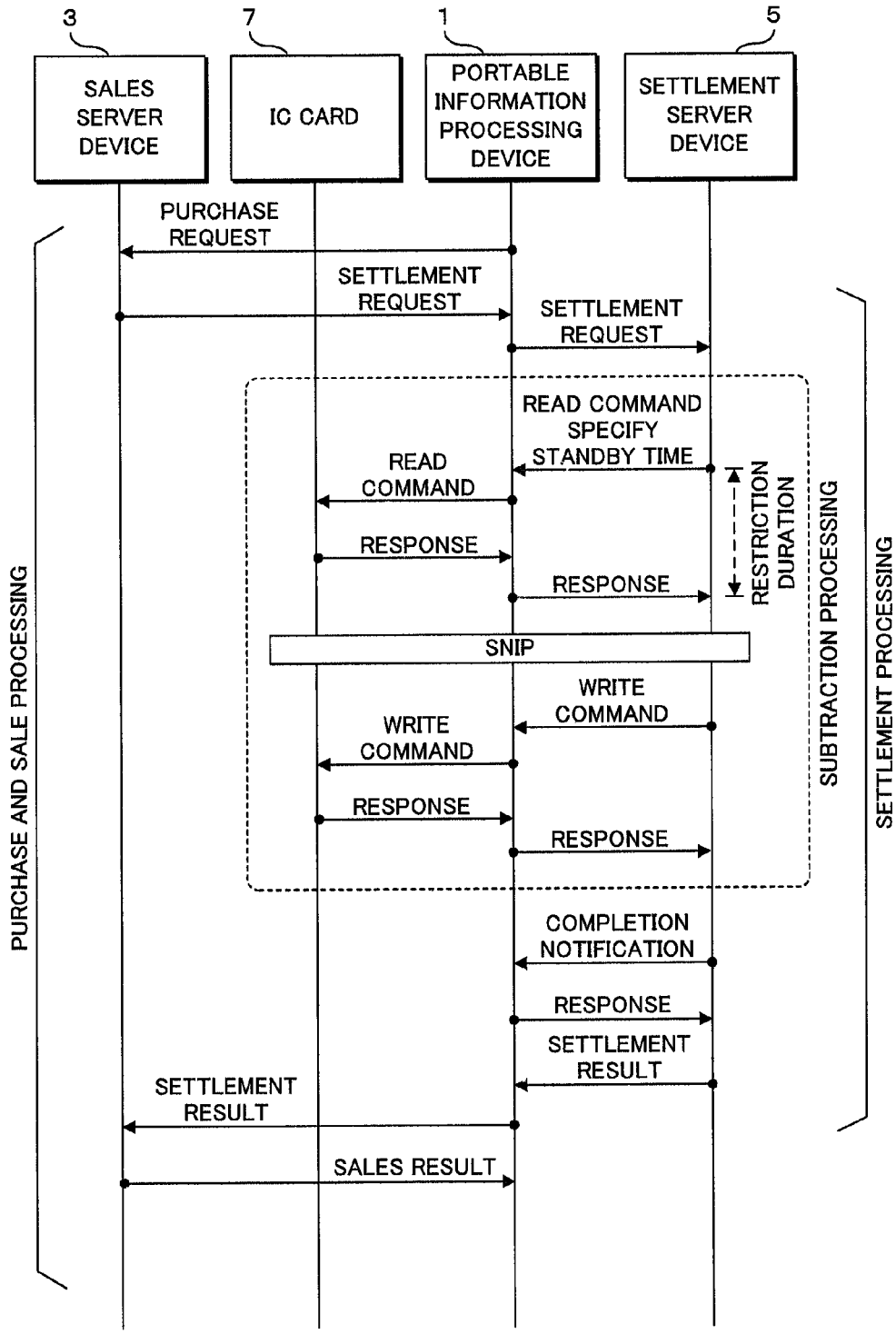
FIG. 9 is a schematic diagram illustrating an example of purchase and sale processing performed by a purchase and sale system according to the present embodiment.

FIG. 9 is a schematic diagram illustrating an example of purchase and sale processing performed by the purchase and sale system according to the present embodiment. Here, the present example is described for a case that the user uses the portable information processing device 1. However, similar processing is performed even when the floor-standing type information processing device 2 is used. Each processing in the portable information processing device illustrated in FIG. 9 is realized when the processing unit 10 reads and executes the client program 91*a*. Further, each processing in the sales server device is realized when the processing unit 30 executes the server program 92*a*. Further, each processing in the settlement server device is realized when the processing unit 50 executes the server program 93*a*. In the purchase and sale processing, the user is allowed to select one to be purchased from the list of merchandise articles displayed on the display unit 13 of the portable information processing device 1 and then operate the operation unit 14 so as to perform purchase request to the sales server device 3. In response to the operation by the user received through the operation unit 14, the purchase processing unit 26 of the portable information processing device 1 transmits a purchase request to containing the ID of the user, who uses the portable information processing device 1, information identifying the merchandise article to be purchased, and information of the number of pieces to be purchased and the like, through the communication unit 15 to the sales server device 3.

In the sales server device 3 having received the purchase request from the portable information processing device 1 through the communication unit 33, the ID generation unit 42 generates a transaction ID to the processing of sales, settlement, and the like of the merchandise article concerning the received purchase request. The sales processing unit 41 of the sales server device 3 generates a settlement request containing the transaction ID, the settlement date and time information, the merchandise price information, information of electronic signature, and the like, and then transmits the generated settlement request through the communication unit 33 to the portable information processing device 1. By virtue of this, settlement processing in the purchase and sale processing is started.

The sales processing unit 41 of the sales server device 3 receiving the purchase request adds information to the sales history information 31a in the storage unit 31. The sales processing unit 41 stores into the sales history information 31a: the transaction ID generated by the ID generation unit 42; the user ID generated or acquired from the information contained in the received purchase request; the merchandise information; the total price; and the date and time of having performed the settlement request, in a manner of being related to each other. At that time, the settlement result of the corresponding sales history information 31a is no receiving and the sales processing status is incomplete.

The settlement processing unit 21 of the portable information processing device 1 having received the settlement request from the sales server device 3 through the communication unit 15 transmits the received settlement request through the communication unit 15 to the settlement server device 5. By virtue of this, transaction processing concerning the settlement to be executed in cooperation with the portable information processing device and the settlement server device is started.

In the settlement server device 5 having received the settlement request from the portable information processing device 1, the ID generation unit 62 generates an update ID. The settlement processing unit 61 of the settlement server device 5 adds information to the settlement history information 51a in the storage unit 51. The settlement processing unit 61 stores into the settlement history information 51a: the transaction ID and the settlement date and time contained in the received settlement request; and the update ID generated by the ID generation unit 62. At that time, the settlement status of the corresponding settlement history information 51a is unfinished settlement and the card ID is undetermined.

Then, the settlement processing unit 61 of the settlement server device 5 starts the processing of acquiring the price information contained in the received settlement request and then subtracting this amount of money from the balance in the IC card 7. In order to identify the IC card 7 used for the settlement processing, the settlement processing unit 61 provides a read command for the IC card 7 to the portable information processing device 1. At that time, the settlement processing unit 61 specifies the standby time until a response is obtained from the portable information processing device 1 (i.e., the standby time until non-contact communication with the IC card 7 is performed). In the present embodiment, for example, the standby time may be set to be 60 seconds. Then, the standby time specified by the settlement server device 5 is the same regardless of which of the portable information processing device 1 and the floor-standing type information processing device 2 is the processing counterpart. When a response from the portable information processing device 1 is not obtained within the standby time, the settlement processing unit 61 suspends the subtraction processing concerning the settlement request provided from the portable information processing device 1.

The settlement processing unit 21 of the portable information processing device 1 having received a read command from the settlement server device 5 performs non-contact communication with the IC card 7 through the non-contact communication unit 16. At that time, the settlement processing unit 21 displays on the display unit 13 a message prompting the user to perform, for example, the work of bringing the IC card 7 close to a given part of the portable information processing device 1, and then executes the standby processing of waiting until non-contact communication with the IC card 7 becomes allowed. That is, the settlement processing unit 21 executes the standby processing of waiting for the IC card 7 to come near a given part of the portable information processing device 1. In the standby processing, the non-contact communication unit 16 repeatedly transmits the read command by the polling function until a response from the IC card 7 is obtained.

At that time, when non-contact communication with the IC card 7 is not allowed to be performed even after the given standby time has elapsed, the settlement processing unit 21 suspends the subtraction processing. Here, in the case of the floor-standing type information processing device 2, the standby time at that time is the standby time (60 seconds) specified by the settlement server device 5. In contrast, in the portable information processing device 1, a time such as 30 seconds shorter than the standby time specified by the settlement server device 5 is set up as the standby time.

When non-contact communication with the IC card 7 has become allowed before the standby time elapses, the settlement processing unit 21 of the portable information processing device 1 transmits a read command to the IC card 7 by non-contact communication. The reader unit 28 of the processing unit 10 performs the processing of transmitting the read command. The settlement processing unit 21 transmits to the settlement server device 5 a response (including information such as the card ID 73a and the balance stored in the storage unit 73 of the IC card 7) to the read command obtained from the IC card 7. The settlement processing unit 61 of the settlement server device 5 having received the response from the portable information processing device 1 acquires the read information contained in the received response. The settlement processing unit 61 performs plural times of such information read operation from the IC card 7 so as to acquire the information such as the card ID 73a and the balance stored in the storage unit 73 of the IC card 7. When the card ID 73a has been acquired from the IC card 7, the settlement processing unit 61 registers the card ID into the settlement history information 51a of the storage unit 51. After that, the settlement processing unit 61 performs read request or the like for the IC card 7 with specifying the card ID 73a, to the portable information processing device 1.

The settlement processing unit 61 of the settlement server device 5 having acquired necessary information from the IC card 7 transmits a write command to the portable information processing device 1 in order to write into the IC card 7 the amount of money obtained by subtracting the merchandise price from the balance in the IC card 7. Further, the settlement processing unit 61 changes into incomplete processing the corresponding settlement status in the settlement history information 51a of the storage unit 51. The settlement processing unit 21 of the portable information processing device 1 having received a write command from the settlement server device 5 performs non-contact communication with the IC card 7 through the non-contact communication unit 16 so as to transmit the write command to the IC card 7. The writer unit 29 of the processing unit 10 performs the processing of transmitting the write command. In accordance with the write command received from the portable information processing device 1 by non-contact communication, the processing unit 70 of the IC card 7 performs write processing to the storage unit 73. By virtue of this, the balance history information 73b in the storage unit 73 is updated. After the termination of the write processing, the processing unit 70 of the IC card 7 performs response to the portable information processing device 1 by non-contact communication. The settlement processing unit 21 of the portable information processing device 1 having received the response from the IC card 7 by non-contact communication transmits the received response to the settlement server device 5.

The settlement processing unit 61 of the settlement server device 5 having received the response from the portable information processing device 1, from the received response, determines whether the information writing to the IC card 7 has succeeded. Here, FIG. 9 illustrates a case that the write processing to the IC card 7 has succeeded. When the write processing has failed, the settlement processing unit 61 may repeatedly transmit the write request to the portable information processing device 1 until the write processing succeeds. When the write processing has succeeded, the settlement processing unit 61 changes into finished settlement the corresponding settlement status in the settlement history information 51a of the storage unit 51. Further, the settlement processing unit 61 notifies completed settlement processing to the portable information processing device 1.

The settlement processing unit 21 of the portable information processing device 1 having received a completion notification from the settlement server device 5 terminates the non-contact communication with the IC card 7 through the non-contact communication unit 16 and then transmits to the settlement server device 5 a response indicating that the completion notification has been received. The settlement processing unit 61 of the settlement server device 5 having received the response from the portable information processing device 1 generates a settlement result containing as information the result of settlement processing (completed settlement, in the present example) and then transmits the generated settlement result to the portable information processing device 1. Here, when the settlement processing has not been allowed to be achieved normally because of an insufficient balance in the IC card 7 or the like, the settlement server device 5 transmits a result of failed settlement. Further, for example, when times out has occurred because of no response from the IC card 7, the settlement server device 5 transmits a result of incomplete processing.

The settlement processing unit 21 of the portable information processing device 1 having received the settlement result from the settlement server device 5 transmits the received settlement result through the communication unit 15 to the sales server device 3. When the sales server device 3 receives the settlement result, the settlement processing is terminated. The sales server device 3 having received the settlement result from the portable information processing device 1, on the basis of the received settlement result, updates the settlement result in the sales history information 31a in the storage unit 31 into completed settlement, failed settlement, or incomplete processing. When the settlement result is completed settlement, the sales processing unit 41 advances the processing of merchandise article sales to the next stage. For example, when the merchandise article is a digital content, the sales processing unit 41 permits download of the digital content. After performing the sales processing, the sales processing unit 41 transmits a sales result to the portable information processing device 1. When the portable information processing device 1 receives the sales result from the sales server device 3, the processing of merchandise article sales and settlement performed through the purchase and sale system according to the present embodiment is terminated. By virtue of this, transaction processing concerning the settlement to be executed in cooperation with the portable information processing device and the settlement server device is terminated.

Here, the "settlement processing" is processing concerning settlement of a merchandise article or a right to be purchased and, in addition to the processing executed in the portable information processing device 1, includes the processing executed in the settlement server device 5. That is, the "restriction unit" may restrict execution of the processing executed in the settlement server device 5. Further, the "settlement processing" is not limited to processing performed in cooperation between the portable information processing device 1 and the settlement server device 5 and may include processing performed in the portable information processing device 1 (independently of the settlement server device 5) or, alternatively, may include processing performed in the settlement server device 5 (independently of the portable information processing device 1). Further, the settlement processing is a concept, in addition to the processing of executing settlement (e.g., the processing of subtraction from the balance data and the processing of generating billing data), including preparation processing and post processing thereof (in the present embodiment, the processing of waiting for read of data of the IC card 7 for settlement, the read processing, and the like).

Here, in the purchase and sale system according to the present embodiment, as the unauthorized access prevention function of the portable information processing device 1, the processing of restricting non-contact communication with the IC card 7 is performed. In the present embodiment, in the portable information processing device 1, a duration between the time that a read command from the settlement server device 5 is received and the time that the first response from the IC card 7 by non-contact communication is transmitted to the settlement server device 5 is adopted as the restriction duration and then restriction processing is performed in this duration. In other words, in the purchase and sale processing and the settlement processing according to the present embodiment, provided are: a restriction duration (a first duration) in which non-contact communication is restricted; and a duration (a second duration) which is other than the restriction duration and in which restriction is not performed.

Here, the restriction duration illustrated in FIG. 9 is an example and employable configurations are not limited to this. For example, the start time point of the restriction duration may be: the time point that the portable information processing device 1 has transmitted the purchase request to the sales server device 3; the time point that the portable information processing device 1 has received the settlement request from the sales server device 3; and the time point that the portable information processing device 1 has transmitted the settlement request to the settlement server device 5. Further, a time point other than these may be employed.

Further, for example, the termination time point of the restriction duration may be: the time point that the last response from the IC card 7 has been transmitted from the portable information processing device 1 to the settlement server device 5; or the time point that the completion notification from the settlement server device 5 has been received by the portable information processing device 1 from the settlement server device 5. Further, a time point other than these may be employed. Further, in the present embodiment, the portable information processing device 1 performs three kinds of restriction and then a different restriction duration may be provided for each of these.

Further, in the present embodiment, a configuration has been employed that the settlement request, the settlement result, and the like transmitted and received between the sales server device 3 and the settlement server device 5 is relayed by the portable information processing device 1. However, employable configurations are not limited to this. That is, a configuration may be employed that the sales server device 3 and the settlement server device 5 directly transmit and receive the settlement request, the settlement result, and the like without intervention of the portable information processing device 1.

Further, in the present embodiment, a configuration has been employed that the subtraction processing is achieved by performing subtraction from the balance information stored in the IC card 7. However, employable configurations are not limited to this. For example, a configuration may be employed that the settlement server device 5 stores the balance information for each IC card 7 and then, on the basis of the card ID or the like acquired from the IC card 7 by non-contact communication with the portable information processing device 1, subtraction is performed from the balance information stored in itself. In this case, in the settlement server device 5, the balance information concerning the IC card 7 may be registered at the first time of use of the IC card 7 or, alternatively, the balance information may be registered prior to the use of the IC card 7. Further, for example, a configuration may be employed that both the IC card 7 and settlement server 5 store the balance information. In this case, by determining whether the balance information in the IC card 7 and the balance information stored in itself agree with each other, the settlement server device 5 is allowed to detect unauthorized rewriting of the balance information in the IC card 7.

<Screen Display of Purchase and Sale Processing>

Figure 10:
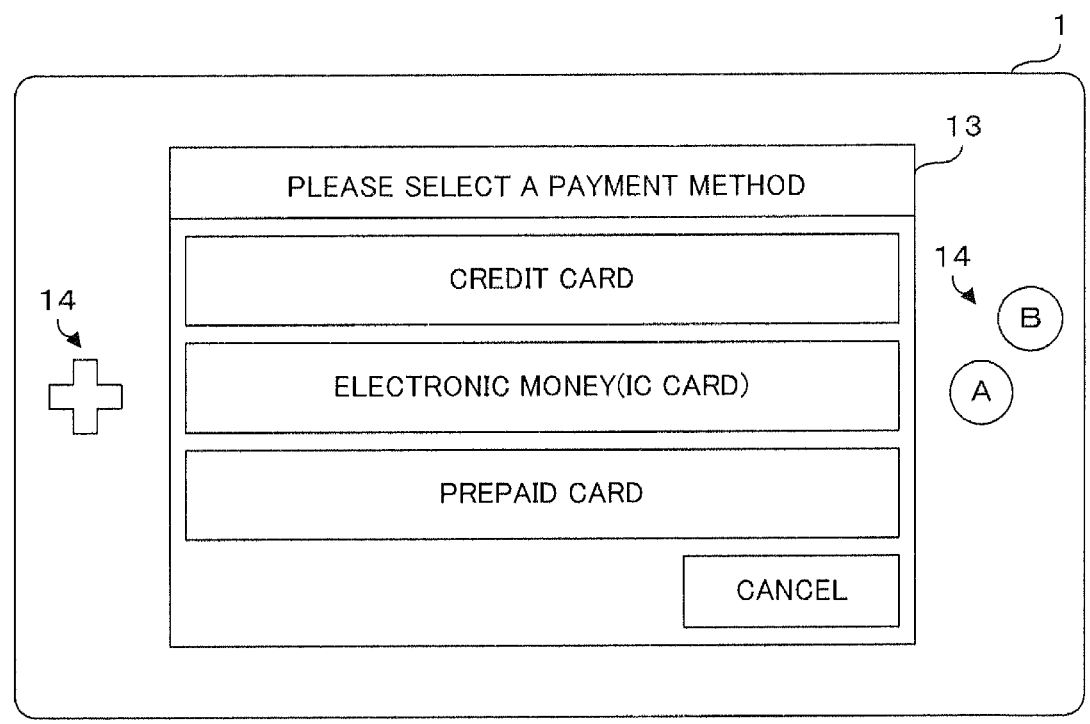
FIG. 10 is a schematic diagram illustrating an example of a payment method selection screen displayed by a portable information processing device.

FIG. 10 is a schematic diagram illustrating an example of a payment method selection screen displayed by the portable information processing device 1. For example, by suitably operating the operation unit 14 in accordance with the merchandise article list displayed on the display unit 13 of the portable information processing device 1, the user is allowed to select a merchandise article of purchase object and perform purchase determination for the selected merchandise article. When the operation of purchase determination has been performed, the display processing unit 25 of the portable information processing device 1 displays on the display unit 13 the payment method selection screen illustrated in FIG. 10. In the payment method selection screen having been illustrated, together with a message "Please select a payment method", three alternatives for the payment method are displayed. The user is allowed to select any one of payment by credit card, subtraction of electronic money charged in the IC card 7, and payment by prepaid card. Here, when cancellation operation has been performed in the present screen, the display processing unit 25 returns the display to the screen of the preceding stage like a confirmation screen for purchase determination and a for-sale merchandise list screen.

Figure 11:
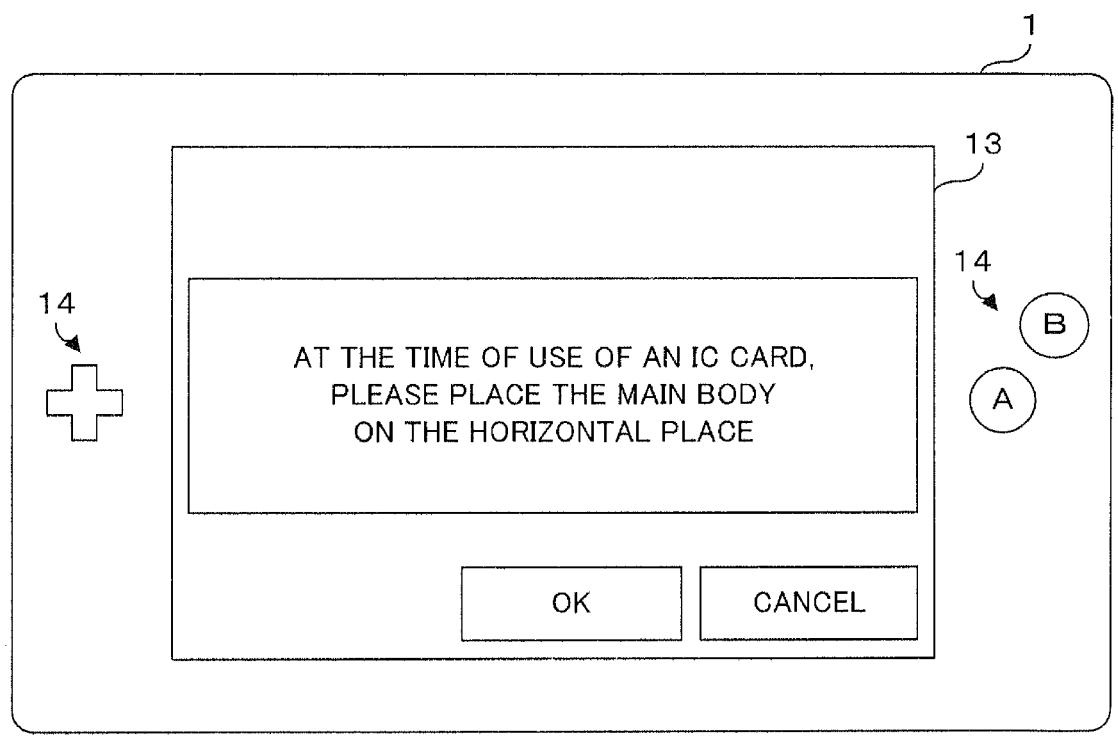
FIG. 11 is a schematic diagram illustrating an example of a warning message display screen displayed by a portable information processing device.

When electronic money has been selected in the payment method selection screen, the display processing unit 25 of the portable information processing device 1 displays on the display unit 13 a warning message concerning the device attitude. FIG. 11 is a schematic diagram illustrating an example of a warning message display screen displayed by the portable information processing device 1. In the warning message display screen having been illustrated, a message "At the time of use of an IC card, please place the main body on the horizontal place" is displayed. By virtue of this, before the start of non-contact communication with the IC card 7, the portable information processing device 1 requests the user to perform given operation, that is, operation on OK in the warning message display screen. When cancellation operation has been performed in the present screen, the display processing unit 25 returns the display to the payment method selection screen illustrated in FIG. 10.

When OK operation has been performed in the warning message display screen, the purchase processing unit 26 of the portable information processing device 1 transmits a purchase request to the sales server device 3 as illustrated in FIG. 9. Then, a settlement request provided from the sales server device 3 in response to this is transmitted from the settlement processing unit 21 to the settlement server device 5. After that, when a read command is provided from the settlement server device 5, the settlement processing unit 21 of the portable information processing device 1 starts non-contact communication through the non-contact communication unit 16 and then waits for non-contact communication with the IC card 7. Further, at that time, the display processing unit 25 displays on the display unit 13 a standby screen of waiting for the use of the IC card 7 by the user.

Figure 12:
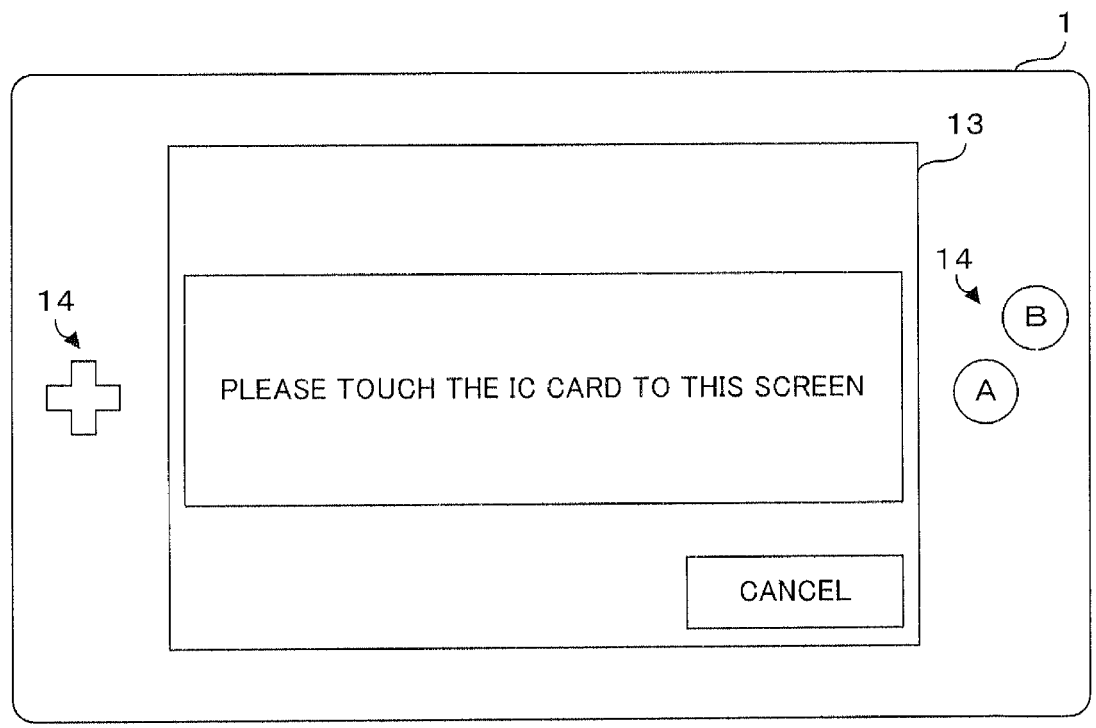
FIG. 12 is a schematic diagram illustrating an example of a standby screen displayed by a portable information processing device.

FIG. 12 is a schematic diagram illustrating an example of the standby screen displayed by the portable information processing device 1. In the standby screen having been illustrated, a message "Please touch the IC card to this screen" is displayed. When the user brings the IC card 7 close to the display unit 13 in a state that the standby screen is displayed, the portable information processing device 1 is allowed to perform non-contact communication with the IC card 7 through the non-contact communication unit 16. Further, when cancellation operation has been performed in the standby screen, the display processing unit 25 returns the display to the payment method selection screen illustrated in FIG. 10. Here, in the communication with the IC card 7 through the non-contact communication unit 16, the IC card 7 is not necessarily to be brought into contact with the display unit 13. That is, it is sufficient that the IC card 7 is brought close to the display unit 13 to an extent that radio waves reach in two directions. However, in order that the user may easily understand the method of use of the IC card 7, in the present embodiment, a message prompting contact operation for the IC card 7 to the display unit 13 is displayed in the standby screen.

When non-contact communication with the IC card 7 has become allowed, the portable information processing device 1 relays information exchange between the IC card 7 and the settlement server device 5. By virtue of this, subtraction processing illustrated in FIG. 9 is performed. After the termination of the subtraction processing, in the portable information processing device 1, the settlement processing unit 21 notifies to the sales server device 3 the settlement result from the settlement server device 5 and, at the same time, the display processing unit 25 displays on the display unit 13 a message (not illustrated) notifying the settlement result to the user. Here, in the settlement result, there are various possible patterns such as success and failure of settlement. Thus, the display processing unit 25 performs message display corresponding to the settlement processing.

Here, in the portable information processing device 1, together with the screen display through the display unit 13, various voice messages may be outputted through a voice output unit 18. Further, a configuration may be employed that the portable information processing device 1 does not perform screen display and outputs a voice message, alone through the voice output unit 18.

<Attitude Restriction>

Figure 13:
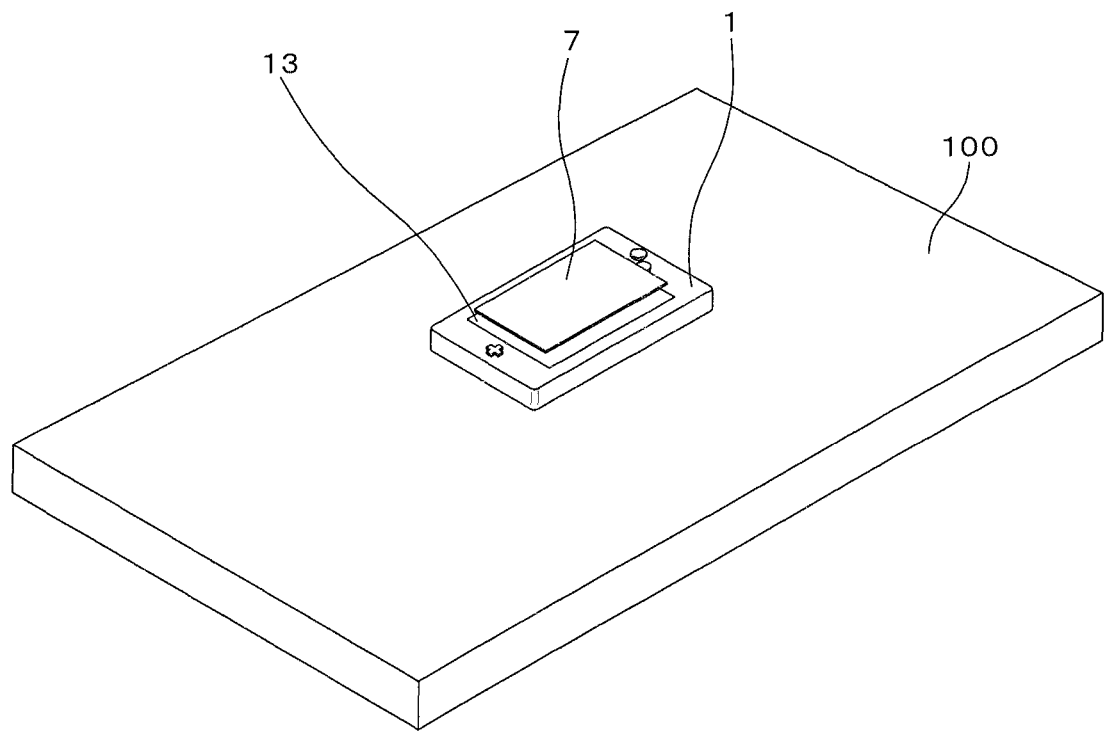
FIG. 13 is a schematic diagram for describing attitude restriction in a portable information processing device.
Figure 14:
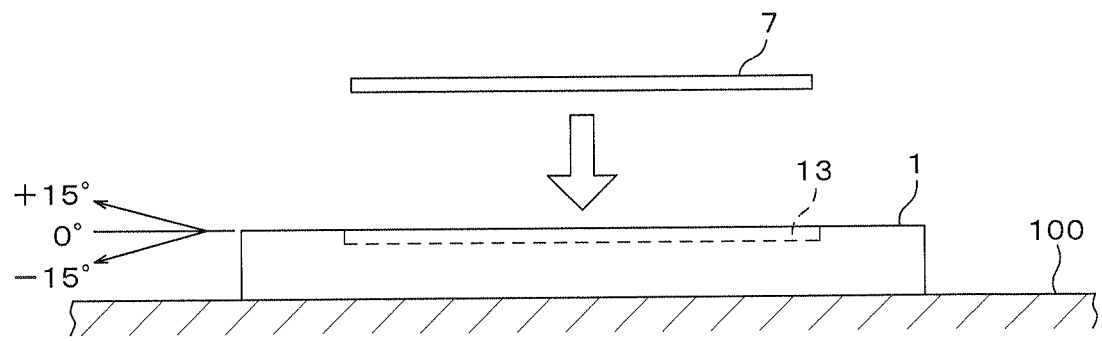
FIG. 14 is a schematic diagram for describing attitude restriction in a portable information processing device.

As an unauthorized access prevention function for the IC card 7, the portable information processing device 1 according to the present embodiment restricts the attitude of the device at the time of performing non-contact communication with the IC card 7. FIGS. 13 and 14 are schematic diagrams for describing attitude restriction in the portable information processing device 1. It is premised that the portable information processing device 1 according to the present embodiment performs non-contact communication with the IC card 7 in a state of being placed on a horizontal plane 100 such as a desktop and a floor.

As illustrated in the figure, the portable information processing device 1 includes a housing having the shape of a substantially rectangular plate. That is, the housing of the portable information processing device 1 has a shape provided with two broad surfaces in front and back and with four sides in the surroundings. In one broad surface (this surface is referred to as a front surface) of the housing, the display unit 13 is provided in the center and one or a plurality of buttons or switches constituting the operation unit 14 are provided therearound. In the non-contact communication unit 16 of the portable information processing device 1 according to the present embodiment, for example, an antenna for non-contact communication is arranged on the surface of the liquid crystal panel constituting the display unit 13 so that non-contact communication with the IC card 7 is allowed within a given distance range from the surface of the display unit 13. However, the portable information processing device 1 according to the present embodiment is premised to have a configuration that in the other broad surface (the back surface) and the four sides of the housing, radio waves for non-contact communication are shielded and hence non-contact communication is not allowed even when the IC card 7 is brought close.

In the portable information processing device 1 according to the present embodiment, the attitude sensing unit 17 is allowed to detect the attitude of the device. When the attitude of the device sensed by the attitude sensing unit 17 is a given attitude, the attitude restriction unit 22 of the portable information processing device 1 permits non-contact communication with the IC card 7 through the non-contact communication unit 16. When the attitude of the device is not a given attitude, the attitude restriction unit 22 inhibits non-contact communication with the IC card 7. The attitude restriction unit 22 is allowed to realize the inhibition of non-contact communication by terminating or stopping the standby processing of waiting for a response from the IC card 7. At that time, the attitude restriction unit 22 may completely terminate the standby processing or, alternatively, may temporarily suspend the standby processing.

The attitude sensing unit 17 in the present embodiment senses the angle of one broad surface (i.e., the surface through which non-contact communication with the IC card 7 is performed or, alternatively, the surface with which the IC card 7 is brought into contact by the user; referred to as the non-contact communication surface, hereinafter) of the housing provided with the display unit 13 and the like relative to the gravity direction. On the basis of the sensing result of the attitude sensing unit 17, when the non-contact communication surface of the housing is facing up and maintained to be substantially horizontal, the attitude restriction unit 22 permits non-contact communication with the IC card 7 through the non-contact communication unit 16. Specifically, when the non-contact communication surface of the housing is oriented in a direction opposite to the gravity direction and the angle of the non-contact communication surface is horizontal±15 degrees, the attitude restriction unit 22 permits non-contact communication with the IC card 7 through the non-contact communication unit 16 and, in a case of falling outside the range of horizontal±15 degrees, inhibits non-contact communication with the IC card 7.

Here, in the present embodiment, the attitude condition for restriction by the attitude restriction unit 22 has been premised that the non-contact communication surface is facing up and the angle of the non-contact communication surface falls within the range of horizontal±15 degrees. This condition has been set up for determining a state that the portable information processing device 1 having the shape illustrated in FIGS. 13 and 14 is placed on a horizontal place. Thus, the attitude condition for restriction may be set up suitably such as to be allowed to determine a state that the housing is placed on a horizontal place in accordance with the shape or the like of the housing of the portable information processing device 1.

For example, a configuration may be employed that attitude restriction is performed with adopting a condition that the IC card 7 is placed on a horizontal place and then the portable information processing device 1 is placed thereon. In this case, a configuration may be employed that the attitude restriction unit 22 performs determination with adopting the condition that, for example, the non-contact communication surface is oriented to the gravity direction (i.e., downward) and the non-contact communication surface falls within the range of horizontal±15 degrees.

After the operation sensing unit 30 has sensed that given operation such as OK operation has been performed to the operation unit 14 in the warning message display screen illustrated in FIG. 11, the attitude restriction unit 22 of the portable information processing device 1 starts acquisition of the sensing result of the attitude sensing unit 17 and determination of the attitude based on the acquired sensing result. In the portable information processing device 1, after the processing such as determination by the attitude restriction unit 22 has been started, the settlement processing unit 21 starts non-contact communication through the non-contact communication unit 16 and, at the same time, the display processing unit 25 displays on the display unit 13 the standby screen illustrated in FIG. 12. During the time that the standby screen is displayed, the attitude restriction unit 22 continuously repeats acquisition of the sensing result of the attitude sensing unit 17 and determination of the attitude based on the acquired sensing result. Further, during this time, the non-contact communication unit 16 continuously performs detection of the IC card 7 by polling.

When the device attitude is determined as being a given attitude, until non-contact communication with the IC card 7 is started through the non-contact communication unit 16, the attitude restriction unit 22 maintains the standby state (e.g., a state that polling is performed) for non-contact communication with the IC card 7 by the portable information processing device 1. As a result, as illustrated in FIG. 12, the state that the standby screen is displayed on the display unit 13 of the portable information processing device 1 is maintained.

In contrast, when the device attitude is determined as not being a given attitude, the attitude restriction unit 22 suspends the standby state for non-contact communication with the IC card 7. That is, the attitude restriction unit 22 stops the polling performed by the non-contact communication unit 16. By virtue of this, the settlement processing unit 21 of the portable information processing device 1 stops the non-contact communication performed through the non-contact communication unit 16. Further, the display processing unit 25 returns the display of the display unit 13 from the standby screen illustrated in FIG. 12 to the warning message display screen illustrated in FIG. 11. Thus, the portable information processing device 1 requests given operation in the warning message display screen (e.g., the operation of selecting OK again in the warning message display screen). Then, when the given operation by the user is received, the standby processing restart unit 27 of the processing unit 10 restarts the standby processing for non-contact communication with the IC card 7. Here, employable methods of requesting the given operation to the user are not limited to this. For example, a message (different from the warning message display screen illustrated in FIG. 11) may be displayed that prompts the user to bring the portable information processing device 1 into a given attitude, a stationary state (described later), or the like.

Figure 15:
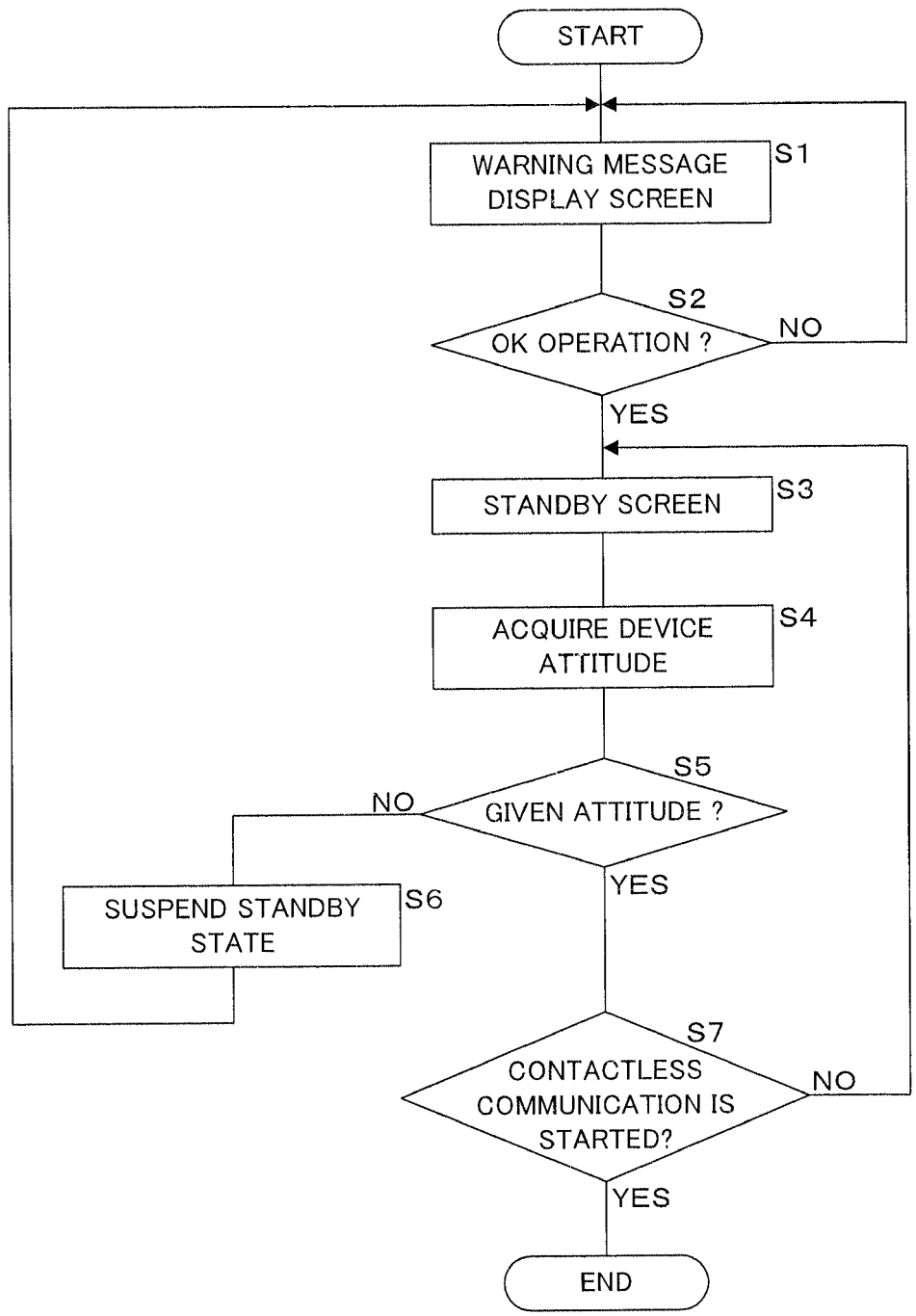
FIG. 15 is a flow chart illustrating a procedure of attitude restriction processing performed by a portable information processing device.

FIG. 15 is a flow chart illustrating a procedure of attitude restriction processing performed by the portable information processing device 1. For example, if electronic money has been selected as the payment method in the payment method selection screen illustrated in FIG. 10, the processing unit 10 of the portable information processing device 1 performs the processing of the display processing unit 25 displaying on the display unit 13 the warning message display screen as illustrated in FIG. 11 (step S1). The processing unit 10 determines whether OK operation has been performed in the warning message display screen (step S2). If OK operation has not been performed (S2: NO), the processing unit 10 returns the processing to step S1 so as to continue displaying the warning message display screen.

If OK operation has been performed (S2: YES), the processing unit 10 performs the processing of the display processing unit 25 displaying the standby screen on the display unit 13 (step S3). Then, the attitude restriction unit 22 of the processing unit 10 acquires the device attitude sensed by the attitude sensing unit 17 (step S4). The attitude restriction unit 22 determines whether the acquired attitude is a given attitude (step S5). If the device attitude is not the given attitude (S5: NO), the attitude restriction unit 22 suspends the standby state for non-contact communication with the IC card 7 (step S6) and then returns the processing to step S1 so that the display processing unit 25 performs display processing for the warning message display screen onto the display unit 13. If the device attitude is a given attitude (S5: YES), the attitude restriction unit 22 determines whether non-contact communication with the IC card 7 through the non-contact communication unit 16 has been started (step S7). If non-contact communication has not been started (S7: NO), the attitude restriction unit 22 returns the processing to step S3 so as to continue displaying the standby screen. If non-contact communication has been started (S7: YES), the attitude restriction unit 22 terminates the attitude restriction processing.

(Modification 1)

In the present embodiment, a configuration has been employed that when the non-contact communication surface of the housing does not fall within the range of horizontal±15 degrees, the attitude restriction unit 22 restricts the non-contact communication with the IC card 7. However, employable methods of restriction based on the attitude are not limited to this. (Further, employable value ranges are not limited to ±15 degrees and ±whatever degrees may be employed as long as a substantially horizontal state is ensured.) For example, a configuration may be employed that the attitude restriction unit 22 performs restriction in accordance with whether the housing of the portable information processing device 1 is in a stationary state. The attitude restriction unit 22 according to modification 1 adopts as a reference the attitude acquired from the attitude sensing unit 17 for the first time after OK operation has been performed in the warning message display screen and then transition to the standby state has been occurred. After that, the attitude restriction unit 22 repeats acquisition of the sensing result of the attitude sensing unit 17 and then, when a change in the attitude from the reference attitude exceeds a threshold (a given limit), suspends the standby state for non-contact communication with the IC card 7.

Further, a configuration may be employed that the attitude restriction unit 22 performs the processing of attitude restriction on various conditions. For example, in place of a change from a reference attitude, a configuration may be employed that the attitude restriction unit 22 performs attitude detection with a given period then, when the difference between the last attitude and the present attitude exceeds a threshold, suspends the standby state for non-contact communication. That is, a configuration may be employed that when the movement of the portable information processing device 1 exceeds a given limit, the attitude restriction unit 22 suspends the standby state.

Further, for example, a configuration may be employed that the portable information processing device 1 performs attitude sensing and the attitude restriction on the basis of a pick-up image from a camera, an image sensor, or the like. In this case, a configuration may be employed that the attitude restriction unit 22 compares a plurality of images obtained by periodical image pick-up so as to calculate the amount of displacement or the like of an object present in the image by image processing and then performs comparison with a threshold.

Further, for example, when a camera is mounted on the back surface of the housing of the portable information processing device 1, a situation that the camera is capturing a desktop or a floor may be added to the condition for determining that the portable information processing device 1 is placed on a desk top or a floor.

Further, for example, a configuration may be employed that attitude restriction is performed with adopting as the condition a situation that a state of the non-contact communication surface of the housing being substantially horizontal is maintained for a given duration. For example, a configuration may be employed that the portable information processing device 1 checks that a substantially horizontal state has been maintained for a given duration (e.g., 15 seconds) after OK operation has been performed in the warning message display screen, and then starts communication with the IC card 7 through the non-contact communication unit 16.

Here, in the present embodiment, attitude restriction by the attitude restriction unit 22 is performed in the settlement processing performed by the settlement processing unit 21.

The attitude restriction unit 22 does not perform restriction in the processing (the non-settlement processing) other than the settlement processing performed by the purchase processing unit 26. The portable information processing device 1 may have: a configuration that the attitude sensing unit 17 does not sense, the attitude during the non-settlement processing; a configuration that although the attitude sensing unit 17 performs attitude sensing but does not notify the sensing result to the processing unit 10; a configuration that the processing unit 10 ignores the sensing result notified by the attitude sensing unit 17; or a configuration that the attitude restriction unit 22 does not perform determination of the attitude condition based on the sensing result.

<Waiting Time Restriction>

As an unauthorized access prevention function for the IC card 7, the portable information processing device 1 according to the present embodiment restricts the standby time until non-contact communication with the IC card 7 is started. As illustrated in FIG. 9, in the purchase and sale system according to the present embodiment, a standby time is specified when the settlement server device 5 provides a read command for the IC card 7 to the portable information processing device 1 or the floor-standing type information processing device 2. In the present embodiment, the standby time specified by the settlement server device 5 is the same regardless of which of the portable information processing device 1 and the floor-standing type information processing device 2 is the settlement processing counterpart. Then, for example, the standby time may be set to be 60 seconds.

When specification of the standby time has been provided from the settlement server device 5, the floor-standing type information processing device 2 waits for non-contact communication with the IC card 7 for the specified standby time. When non-contact communication with the IC card 7 has not been performed within the standby time, the floor-standing type information processing device 2 suspends the settlement processing. Further, when a response from the floor-standing type information processing device 2 has not been obtained within the specified standby time, the settlement server device 5 suspends the settlement processing.

In contrast, in the portable information processing device 1 according to the present embodiment, a time shorter than the standby time specified by the settlement server device 5 is set up as the standby time of waiting for non-contact communication with the IC card 7. For example, even when a standby time of 60 seconds has been specified by the server device 5, a standby time of 30 seconds may be set up in the portable information processing device 1. Here, the standby time of the portable information processing device 1 may be equal to the time determined in advance in the purchase and sale system or, alternatively, may be a time calculated by an arithmetic operation like 50% of the standby time specified by the server device 5.

When electronic money has been selected in the payment method selection screen illustrated in FIG. 10 and then OK operation has been performed in the then-displayed warning message display screen of FIG. 11, the standby time restriction unit 23 of the portable information processing device 1 starts time counting for the standby time. During the time that the standby screen illustrated in FIG. 12 is displayed on the display unit 13, the standby time restriction unit 23 continues time counting for the standby time. When non-contact communication with the IC card 7 has not been performed within the standby time, the standby time restriction unit 23 suspends the settlement processing. When the settlement processing has been suspended, in the portable information processing device 1 according to the present embodiment, the display of the display unit 13 is returned to the payment method selection screen illustrated in FIG. 10. That is, when the settlement processing has been suspended, the settlement processing unit 21 of the portable information processing device 1 according to the embodiment, returns the purchase and sale processing to the stage of selection of a settlement method.

Here, the portable information processing device 1 may return the purchase and sale processing to a stage prior to the payment method selection screen like a stage of displaying a merchandise article selection screen (not illustrated) displaying a list of merchandise articles allowed to be purchased and receiving selection operation for a merchandise article by the user. The portable information processing device 1 returns the purchase and sale processing to a stage that requires at least once or more times of operation reception by the user by the time of reaching the stage of performing non-contact communication with the IC card 7.

Figure 16:
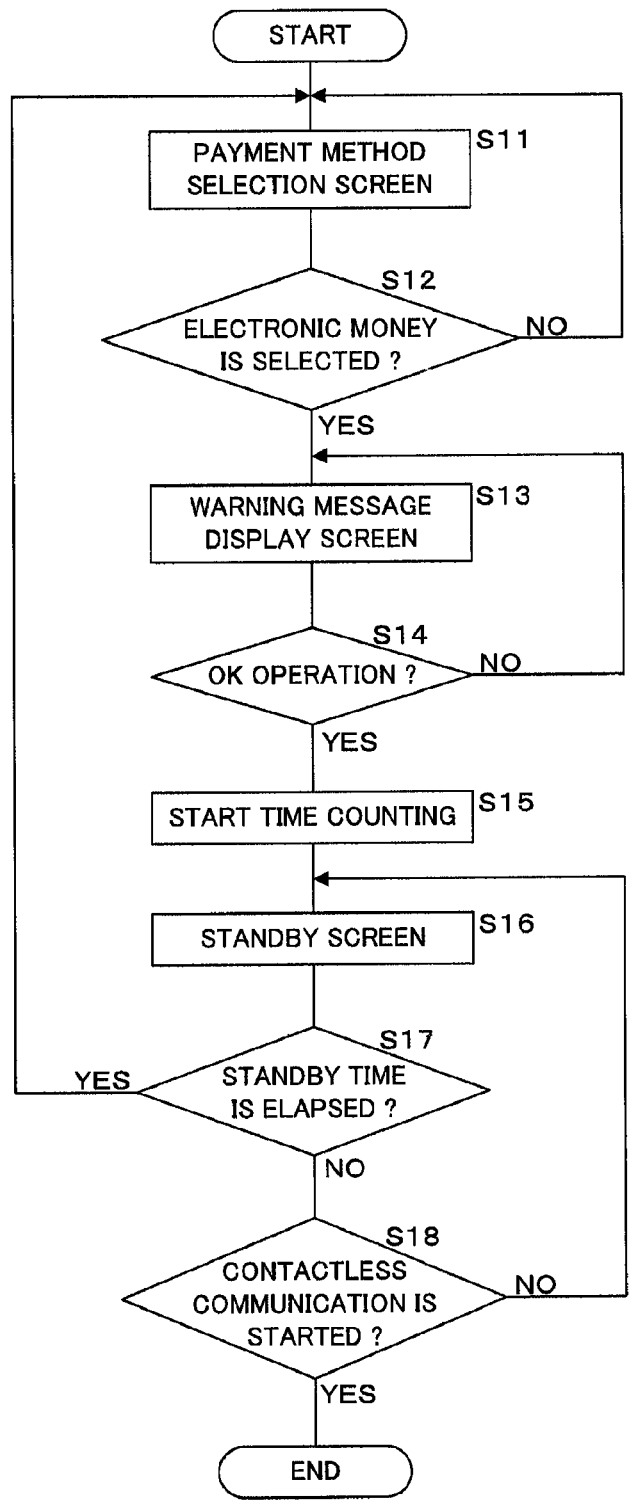
FIG. 16 is a flow chart illustrating a procedure of standby time restriction processing performed by a portable information processing device.

FIG. 16 is a flow chart illustrating a procedure of standby time restriction processing performed by the portable information processing device 1. The present flow chart partly overlaps with the flow chart illustrated in FIG. 15. This is because the flow chart of FIG. 16 illustrates processing concerning the time restriction extracted from the entirety of the settlement processing performed by the portable information processing device 1 and the flow chart of FIG. 15 illustrates processing concerning the attitude restriction extracted therefrom. In practice, the portable information processing device 1 performs the processing illustrated in FIGS. 15 and 16 simultaneously as single settlement processing.

In the processing unit 10 of the portable information processing device 1, the display processing unit 25 performs the processing of displaying on the display unit 13 the payment method selection screen illustrated in FIG. 10 (step S11). The processing unit 10 determines whether electronic money has been selected as the payment method in the payment method selection screen (step S12). If electronic money has not been selected (S12: NO), the processing unit 10 returns the processing to step S11 so as to continue displaying the payment method selection screen. Description is not given for the processing of the cases that the other payment methods have been selected in the payment method selection screen.

If electronic money has been selected in the payment method selection screen (S12: YES), the processing unit 10 performs the processing of the display processing, unit 25 displaying the warning message display screen on the display unit 13 (step S13). The processing unit 10 determines whether OK operation has been performed in the warning message display screen (step S14). If OK operation has not been performed (S14: NO), the processing unit 10 returns the processing to step S13 so as to continue displaying the warning message display screen.

If OK operation has been performed (S14: YES), the standby time restriction unit 23 of the processing unit 10 starts time counting for the given standby time by using a built-in timer function or the like (step S15). Further, the processing unit 10 performs the processing of the display processing unit 25 displaying the standby screen on the display unit 13 (step S16). The standby time restriction unit 23 determines whether the given standby time (e.g., 30 seconds) has elapsed from the start of time counting at step S15 (step S17). If the standby time has elapsed (S17: YES), the standby time restriction unit 23 returns the processing to step S11 so as to return the stage of settlement processing to the display of the payment method selection screen. At that time, the processing unit 10 may display the payment method selection screen after displaying an error message or the like.

If the standby time has not elapsed (S17: NO), the standby time restriction unit 23 determines whether non-contact communication with the IC card 7 through the non-contact communication unit 16 has been started (step S18). If non-contact communication has not been started (S18: NO), the standby time restriction unit 23 returns the processing to step S16 so as to continue displaying the standby screen. If non-contact communication has been started (S18: YES), the standby time restriction unit 23 terminates the standby time restriction processing.

As a method of restricting the standby time for non-contact communication with the IC card 7 by the portable information processing device 1, methods described in the following modifications 2 to 3 may be employed.

(Modification 2)

The portable information processing device 1 according to modification 2 changes the standby time in accordance with the type or the like of the application program executed in the processing unit 10. In the portable information processing device 1 according to the present embodiment, in addition to the client program 91*a* for utilizing the online purchase and sale system, various application programs stored in the storage unit 11 or the storage medium 91 are allowed to be executed in the processing unit 10. For example, by executing a game program, the portable information processing device 1 is allowed to perform information processing concerning the game. In this case, the portable information processing device 1 is allowed to realize a game employing an IC card in which an IC tag is embedded or employing a data storage medium such as a figure.

When non-contact communication with a data storage medium through the non-contact communication unit 16 is to be performed, the portable information processing device 1 according to modification 2 changes the standby time of waiting for non-contact communication with the data storage medium in accordance with the application program executed in the processing unit 10 (an application program having requested the non-contact communication with the data storage medium). For example, the portable information processing device 1 stores in the storage unit 11 a table or the like in which the application program and the standby time are related to each other, and then refers to this table on the basis of the application program under execution so as to be allowed to determine the standby time. Here, as for the standby time, a short time (e.g., 30 seconds) is set up for an application program that performs settlement processing with the settlement server device 5 and a long time (e.g., 60 seconds) is set up for an application program that does not perform settlement processing.

(Modification 3)

Even in a case of non-contact communication with the IC card 7 concerning one client program 91*a*, the portable information processing device 1 according to modification 3 changes the standby time in accordance with the contents of processing. The portable information processing device 1 executing the client program 91*a* is allowed to perform the above-described settlement processing with the settlement server device 5 by non-contact communication with the IC card 7 and, at the same time, is allowed to perform the processing not requiring communication with the settlement server device like inquiry for the balance in the IC card 7. In the portable information processing device 1 according to modification 3, the standby time is set to be a short time in a case of non-contact communication with the IC card 7 at the time of performing settlement processing with the settlement server device 5 and the standby time is set to be a long time in the case of non-contact communication with the IC card 7 at the time of performing processing other than settlement processing.

(Modification 4)

The portable information processing device 1 according to modification 4 changes the standby time in accordance with the type of the data storage medium performing non-contact communication. For example, when the IC card 7 allowed to be used for the settlement processing performed with electronic money is provided from a plurality of companies, the portable information processing device 1 changes the standby time of non-contact communication in accordance with which company has issued the IC card 7 used for the settlement processing.

In the portable information processing device 1 according to modification 4, the payment method selection screen displayed on the display unit 13 in settlement processing displays alternatives for individual companies providing the IC card 7 like "electronic money of company A" and "electronic money of company B". The user performs operation to the operation unit 14 of the portable information processing device 1 so as to select the providing company of the IC card 7 used by oneself from the alternatives displayed on the payment method selection screen. In the portable information processing device 1, a standby time has been set up for each providing company of the IC card 7 and then the standby time is determined in accordance with the selection by the user.

Further, in addition to the restriction of the standby time (or separately from this), as illustrated in the following modification 5, the portable information processing device 1 may employ restriction concerning the time of maintaining non-contact communication with the IC card 7.

(Modification 5)

In the portable information processing device 1 according to modification 5, a situation that a state that non-contact communication with the IC card 7 is allowed is maintained for a given time (e.g., 30 seconds) is required as the condition for starting settlement processing with the settlement server device 5 using the IC card 7. When non-contact communication with the IC card 7 through the non-contact communication unit 16 has become allowed within the standby time, the portable information processing device 1 according to modification 5 determines whether non-contact communication with the IC card 7 is allowed, with a given period (e.g., once per second). When non-contact communication with the IC card 7 has been determined as being allowed successively in given times (e.g., 30 times), the portable information processing device 1 advances the processing to the next stage of settlement processing.

FIG. 17 is a flow chart illustrating a procedure of processing performed by the portable information processing device 1 according to modification 5. Here, the processing illustrated in the present flow chart is processing to be performed, for example, after FIGS. 15 and 16. Further, in the present processing, a counter for counting of the number of times of determination is employed. Then, for example, the counter is realized by using an internal memory of the processing unit 10 or a part of the storage area of the storage unit 11.

The processing unit 10 of the portable information processing device 1 according to modification 5 first initializes the value in the counter into 0 (step S21). Then, the processing unit 10 performs non-contact communication with the IC card 7 through the non-contact communication unit 16 (step S22). From the result of non-contact communication at step S22, the processing unit 10 determines whether communication with the IC card 7 is allowed (step S23). When communication with the IC card 7 is not allowed (S23: NO), the processing unit 10 suspends the settlement processing (step S24) and then terminates the processing.

When communication with the IC card 7 is allowed (S23: YES), the processing unit 10 adds 1 to the value in the counter (step S25). Then, the processing unit 10 determines whether the value in the counter exceeds 30 (step S26). When the value in the counter does not exceed 30 (S26: NO), the processing unit 10 returns the processing to step S22. When the value in the counter exceeds 30 (S26: YES) the processing unit 10 perform subsequent settlement processing (step S27) and then terminates the processing.

<Communication Distance Restriction>

As an unauthorized access prevention function for the IC card 7, the portable information processing device 1 according to the present embodiment restricts the distance in which non-contact communication with the IC card 7 is allowed. For example, in non-contact communication by NFC or the like, the IC card 7 is not to be brought into contact with the housing of the portable information processing device 1 and hence communication is allowed even with a separation of distance of several cm or the like from the housing. In the portable information processing device 1 according to the present embodiment, when settlement processing with the settlement server device 5 is to be performed, the intensity of the radio signal outputted by the non-contact communication unit 16 is reduced so that the distance in which non-contact communication is allowed is reduced in comparison with the ordinary case. For example, in the portable information processing device 1, the intensity of the radio signal at the time of performing non-contact communication for settlement processing is reduced to approximately 50% in comparison with the intensity of the radio signal at the time of performing non-contact communication for processing other than settlement processing.

The non-contact communication unit 16 of the portable information processing device 1 according to the present embodiment is allowed to change the intensity of the radio signal in response to a command from the processing unit 10. The non-contact communication unit 16 changes the intensity of the radio signal, for example, in two steps. When non-contact communication with the IC card 7 is to be performed in response to a read command from the settlement server device 5, the communication distance restriction unit 24 of the processing unit 10 provides to the non-contact communication unit 16 a command of reducing the intensity of the radio signal. By virtue of this, the intensity of the radio signal outputted by the non-contact communication unit 16 is reduced so that the distance in which non-contact communication between the portable information processing device 1 and the IC card 7 is allowed becomes short.

FIG. 18 is a flow chart illustrating a procedure of communication distance restriction processing performed by the portable information processing device 1. The communication distance restriction unit 24 of the processing unit 10 of the portable information processing device 1 determines whether a request for access to the IC card 7 (i.e., a read command) has been provided from the settlement server device 5 (step S31). When a request from the settlement server device 5 has not been provided (S31: NO), the communication distance restriction unit 24 waits until a request is provided. When a request from the settlement server device 5 has been provided (S31: YES), the communication distance restriction unit 24 provides a command of reducing the signal intensity to the non-contact communication unit 16 (step S32).

After that, the communication distance restriction unit 24 determines whether the settlement processing using the IC card 7 has been terminated (step S33). Here, in addition to normal termination of the settlement processing, termination of the settlement processing includes abnormal termination such as suspended settlement by any reason. When the settlement processing has not been terminated (S33: NO), the communication distance restriction unit 24 waits until settlement processing is terminated. When the settlement processing has been terminated (S33: YES), the communication distance restriction unit 24 provides to the non-contact communication unit 16 a command of returning the signal intensity to the original intensity (step S34) and then terminates the processing.

Here, in one time of settlement processing, non-contact communication between the portable information processing device 1 and the IC card 7 is performed in plural times. Then, a configuration may be employed that the communication distance restriction unit 24 performs restriction in the first one time of the non-contact communication and does not perform restriction in the second and subsequent times of the non-contact communication. Further, as for the method of restricting the distance in which non-contact communication with the IC card 7 is allowed, in addition to the method of reducing the intensity of the radio signal outputted by the non-contact communication unit 16 as described above, for example, a method described in the following modification 6 may also be employed.

(Modification 6)

The non-contact communication unit 16 of the portable information processing device 1 according to modification 6 has a function of, when a radio signal concerning non-contact communication has been received from the IC card 7, measuring the signal intensity of the radio signal. When a radio signal from the IC card 7 has been received, the non-contact communication unit 16 provides data concerning the radio signal, to the processing unit 10 and, at the same time, notifies the measured signal intensity to the processing unit 10.

The communication distance restriction unit 24 of the processing unit 10 determines whether the signal intensity notified from the non-contact communication unit 16 exceeds a threshold. When the signal intensity does not exceed the threshold, the communication distance restriction unit 24 nullifies the received signal and hence does not perform settlement processing based on the data from the IC card 7 contained in the received signal. When the signal intensity exceeds the threshold, the communication distance restriction unit 24 validates the received signal and hence performs settlement processing.

Figure 19:
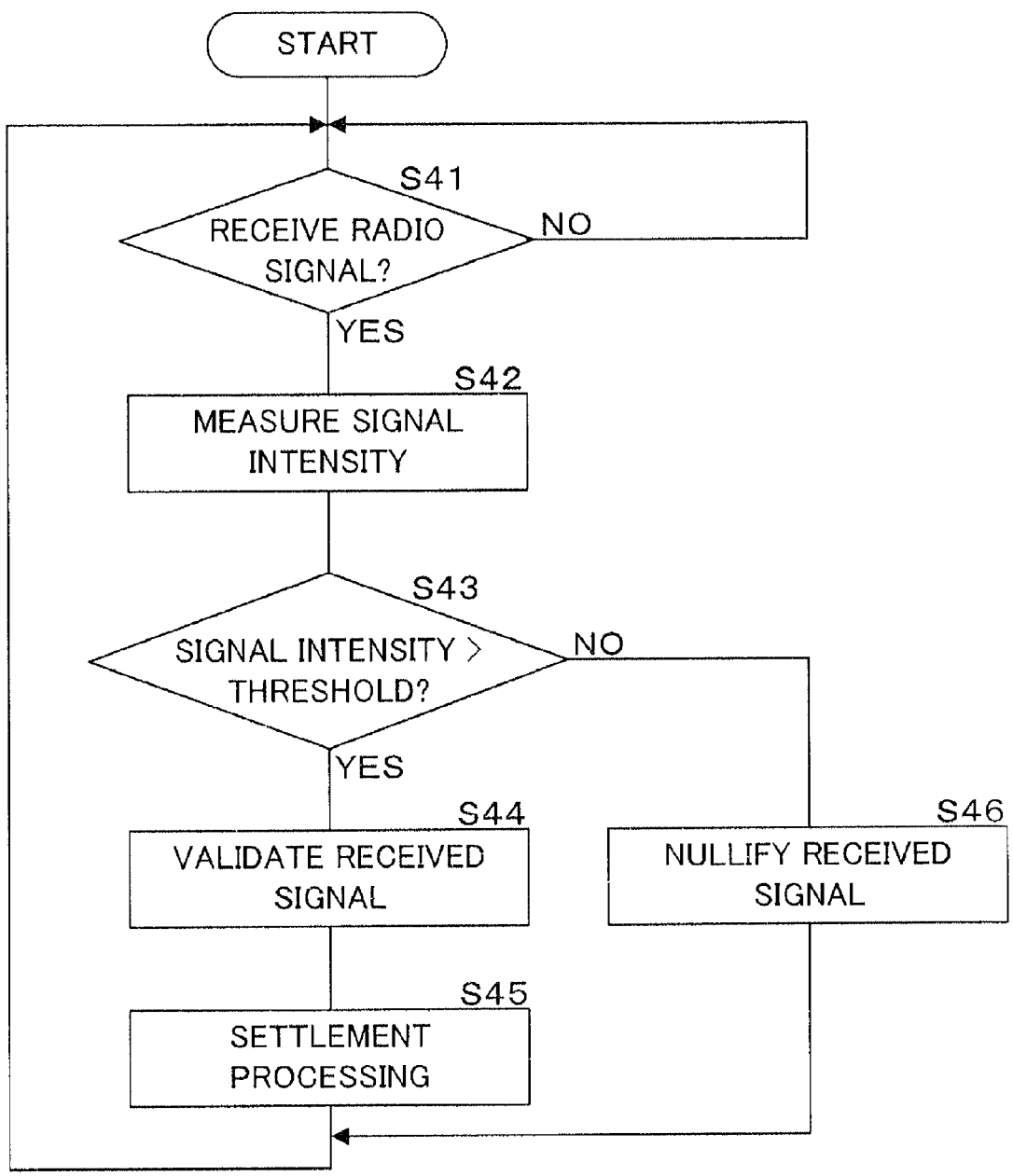
FIG. 19 is a flow chart illustrating a procedure of communication distance restriction processing performed by a portable information processing device according to modification 6.

FIG. 19 is a flow chart illustrating a procedure of communication distance restriction processing performed by the portable information processing device 1 according to modification 6. The non-contact communication unit 16 of the portable information processing device 1 according to modification 6 determines whether a radio signal from the IC card 7 has been received (step S41). When a radio signal has not been received (S41: NO), the non-contact communication unit 16 waits until a radio signal is received. When a radio signal has been received (S41: YES), the non-contact communication unit 16 measures the signal intensity of the received radio signal (step S42).

The communication distance restriction unit 24 of the processing unit 10 of the portable information processing device 1 determines whether the signal intensity measured by the non-contact communication unit 16 exceeds a given threshold (step S43). When the signal intensity exceeds the threshold (S43: YES), the communication distance restriction unit 24 validates the signal received through the non-contact communication unit 16 (step S44), hence performs settlement processing using the data contained in the received signal (step S45), and then returns the processing to step S41. When the signal intensity does not exceed the threshold (S43: NO), the communication distance restriction unit 24 nullifies the signal received through the non-contact communication unit 16 (step S46) and then returns the processing to step S41 without performing settlement processing.

SUMMARY

The purchase and sale system according to the present embodiment has a configuration that the portable information processing device 1 or the floor-standing type information processing device 2 performs communication with the server device 5 so that settlement processing concerning a merchandise article sold and purchased through the sales server device 3 is performed by using the IC card 7. The portable information processing device 1 according to the present embodiment includes the non-contact communication unit 16 performing non-contact communication with the IC card 7 and has a function of preventing unauthorized data acquisition from the IC card 7.

The portable information processing device 1 according to the present embodiment includes the attitude sensing unit 17 detecting the attitude of the device by using an acceleration sensor, a gyro sensor, or the like. When the attitude detected by the attitude sensing unit 17 does not satisfy a given attitude condition, the attitude restriction unit 22 of the portable information processing device 1 restricts settlement processing. At that time, the attitude restriction unit 22 restricts the data acquisition performed by the non-contact communication from the IC card 7 thereby restricts the settlement processing. By virtue of this, the attitude of the device at the time of performing settlement processing using the IC card 7 is allowed to be restricted. Thus, a situation is allowed to be prevented that a malicious user uses the portable information processing device 1 in an unauthorized manner and thereby uses the IC card 7 of another user for the own settlement without permission.

After non-contact communication with the IC card 7 in settlement processing has been terminated, for example, after the subtraction processing illustrated in FIG. 9 has been terminated, the portable information processing device 1 does not perform settlement processing restriction based, on the attitude detected by the attitude sensing unit 17. Since the attitude restriction is limited such as to be performed only at the time of non-contact communication with the IC card 7, convenience degradation in the portable information processing device 1 caused by attitude restriction is allowed to be suppressed.

Further, the display processing unit 25 of the portable information processing device 1 displays on the display unit 13 an image prompting that the attitude of the own device may satisfy an attitude condition like the warning message display screen illustrated in FIG. 11. Further, when the attitude restriction unit 22 has restricted the settlement processing, the portable information processing device 1 displays the warning message display screen on the display unit 13. By virtue of this, the user is allowed to be notified that the portable information processing device 1 is to satisfy the attitude condition in order that the settlement processing is achieved.

Further, the attitude restriction unit 22 of the portable information processing device 1 restricts settlement processing with adopting as the attitude condition a situation that the own device is in an attitude of being placed on a substantially horizontal plane. For example, the attitude restriction unit 22 restricts settlement processing with adopting as the attitude condition a situation that the surface through which non-contact communication with the IC card 7 is performed in the housing of the portable information processing device 1 is substantially horizontal (within the range of horizontal±15 degrees). By virtue of this, the portable information processing device 1 in an attitude of being substantially vertical is not allowed to be used for settlement processing. Thus, unauthorized use of the portable information processing device 1 by a malicious user is allowed to be suppressed.

Further, the attitude restriction unit 22 of the portable information processing device 1 may restrict the settlement processing with adopting as the attitude condition a situation that the own device is in a substantially stationary state. For example, the attitude restriction unit 22 may adopt as the attitude condition of substantially stationary state a situation that a change in the attitude sensed by the attitude sensing unit 17 does not exceed a threshold. By virtue of this, it becomes difficult to perform settlement processing in a state that the portable information processing device 1 is carried around. Thus, unauthorized use of the portable information processing device 1 by a malicious user is allowed to be suppressed.

Further, a configuration may be employed that the portable information processing device 1 and the floor-standing type information processing device 2 are allowed to perform information processing concerning a game by executing a game program. That is, the portable information processing device 1 and the floor-standing type information processing device 2 may be a portable game device and a floor-standing type game device. When a function of performing settlement processing using the IC card 7 is installed in the game device, purchase of an item or the like in the game program or the game is allowed to be performed by the user by using the IC card 7. Thus, convenience of the game device is allowed to be improved.

Further, the IC card 7 may be common to an IC card used for payment of fares in transportation facilities such as electric train and bus. Thus, the user is not required to carry a dedicated IC card for payment of the online purchase and sale system. Thus, the convenience of system utilization is allowed to be improved.

Further, in the portable information processing device 1 and the floor-standing type information processing device 2, a standby time between the time that OK operation has been performed in the warning message display screen illustrated in FIG. 11 and the time that the non-contact communication unit 16 performs non-contact communication with the IC card 7 is provided and then, when non-contact communication has not been performed within the standby time, settlement processing is suspended. In the purchase and sale system according to the present embodiment, different standby times with each other are used in the portable information processing device 1 and in the floor-standing type information processing device 2. For example, the standby time of the portable information processing device 1 is set shorter than the standby time of the floor-standing type information processing device 2. Further, the settlement server device 5 specifies the standby time for the portable information processing device 1 and the floor-standing type information processing device 2. However, in the present embodiment, a time shorter than the standby time specified by the settlement server device 5 is set up as the standby time of the portable information processing device 1. By virtue of these, unauthorized use of the portable information processing device 1 is allowed to be suppressed and, at the same time, convenience degradation in the floor-standing type information processing device 2 whose unauthorized use is not easily is allowed to be prevented.

Before the stage of performing non-contact communication with the IC card 7 in settlement processing, the portable information processing device 1 displays on the display unit 13 a screen for receiving input from the user and then, after input has been received in this screen, transits to the stage of performing non-contact communication. After that, when the settlement processing has failed, the portable information processing device 1 returns the display to the screen for input receiving. Here, for example, the screen for input receiving may be the payment method selection screen illustrated in FIG. 10 or the screen for merchandise article selection in a preceding stage. By virtue of this, successive trial of non-contact communication with the IC card 7 becomes difficult. Thus, unauthorized use of the portable information processing device 1 is allowed to be suppressed.

Further, when a state that non-contact communication with the IC card 7 through the non-contact communication unit 16 is allowed has been maintained for a given time, the portable information processing device 1 acquires data from the IC card 7 and then performs settlement processing. This causes a necessity that the IC card 7 is maintained close to the portable information processing device 1 for a long time. Thus, unauthorized use of the portable information processing device 1 is allowed to be suppressed.

Further, in the settlement server device 5, the storage unit 51 stores the settlement history information 51a and then the settlement history information 51a contains information concerning the right or wrong of the settlement processing. When such a history is stored, information concerning the user, the portable information processing device 1, or the like having tried unauthorized use is allowed to be retrieved later.

Further, the portable information processing device 1 performs wireless, through the communication unit 15, communication of longer distance than the communication distance with the IC card 7 through the non-contact communication unit 16. The portable information processing device 1 performs the communication with the server device 5 by wireless communication through the communication unit 15. By virtue of this, the convenience of the portable information processing device 1 is allowed to be improved.

Further, when non-contact communication with the IC card 7 concerning settlement processing is to be performed, the portable information processing device 1 restricts the communication distance of non-contact communication. For example, the communication distance restriction unit 24 of the portable information processing device 1 may reduce the intensity of the radio signal outputted by the non-contact communication unit 16 so as to reduce the communication distance of non-contact communication. Further, for example, the communication distance restriction unit 24 may measure the intensity of the received signal from the IC card 7 and then when the intensity does not exceed a threshold, nullify the received signal so as to reduce the communication distance of non-contact communication. By virtue of this, at the time of settlement processing, a necessity arises that the IC card 7 is brought close to the portable information processing device 1 within a short distance. Thus, unauthorized use of the portable information processing device 1 is allowed to be suppressed.

Here, in the present embodiment, the sales server device 3 has been constructed as one device. However, employable configurations are not limited to this. That is, the sales server device 3 may be constructed from two or more devices. Similarly, in the present embodiment, the settlement server device 5 has been constructed as one device. However, employable configurations are not limited to this. That is, the settlement server device 5 may be constructed from two or more devices. Further, the data storage medium storing the data concerning settlement has been premised to be the IC card 7. However, employable data storage media are not limited to card-type one and various configurations may be employed. For example, any communications device allowed to perform non-contact communication may be employed.

The procedures and the like of processing of the portable information processing device 1, the sales server device 3, and the settlement server device 5 illustrated in the present embodiment are examples and employable configurations are not limited to these. Further, the configurations of the balance history information 73b illustrated in FIG. 4, the sales history information 31a illustrated in FIG. 6, and the settlement history information 51a illustrated in FIG. 8 are examples and employable configurations are not limited to these. Further, the device configuration of the purchase and sale system and the function assignment to each device are not limited to those described in the present embodiment. For example, at least a part of the function of the portable information processing device 1 described in the present embodiment may be imparted to the sales server device 3 or the settlement server device 5. On the contrary, at least a part of the function of the sales server device 3 or the settlement server device 5 may be imparted to the portable information processing device 1.

Embodiment 2

The purchase and sale system according to Embodiment 2 has a configuration that the settlement server device 5 controls the standby time for which the portable information processing device 1 and the floor-standing type information processing device 2 wait to perform non-contact communication with the IC card 7. A device ID for identifying the device is imparted in advance to each of the portable information processing device 1 and the floor-standing type information processing device 2 according to Embodiment 2. Then, the device ID is stored in the storage unit 11 or the like. When a settlement request is to be transmitted to the settlement server device 5, the portable information processing device 1 and the floor-standing type information processing device 2 transmits the device ID of the own device in a manner of being attached to the settlement request.

Here, the device ID according to the present embodiment is information that permits identification of at least the type of the device like whether the device is portable or of floor-standing type. Thus, the device ID is not to be imparted uniquely to each device and hence may be information common to a plurality of devices like the model name and the model number of the device.

The settlement server device 5 having received the settlement request from the portable information processing device 1 or the floor-standing type information processing device 2 determines the standby time on the basis of the device ID imparted to the settlement request. For example, on the basis of the device ID, the settlement server device 5 determines from which of a portable device or from a floor-standing type device the settlement request has been transmitted. When the device of counterpart of the settlement processing is of floor-standing type, the settlement server device 5 specifies a long time such as 60 seconds as the standby time. In contrast, when the device of counterpart of the settlement processing is portable, the settlement server device 5 specifies a short time such as 30 seconds as the standby time.

In the settlement server device 5 according to Embodiment 2, information used for determining the type or the like of the device on the basis of the device ID is stored, for example, in the storage unit 51. This information may be a table in which the device ID is stored in a manner of being related to portable or of floor-standing type. Here, a configuration may be employed, that the portable information processing device 1 and the floor-standing type information processing device 2 transmits, in place of the device ID, information indicating the type of the own device together with the settlement request to the settlement server device 5. In this case, the settlement server device 5 is not to store the above-described table or the like and is allowed to determine the standby time corresponding to the device type received together with the settlement request.

The portable information processing device 1 and the floor-standing type information processing device 2 wait for non-contact communication with the IC card 7 for the standby time specified together with the read command. Here, in the portable information processing device 1 in Embodiment 1, a standby time shorter than the standby time specified by the settlement server device 5 has been employed. In contrast, the portable information processing device 1 according to Embodiment 2 waits for non-contact communication with the IC card 7 by using the standby time specified by the settlement server device 5.

Figure 20:
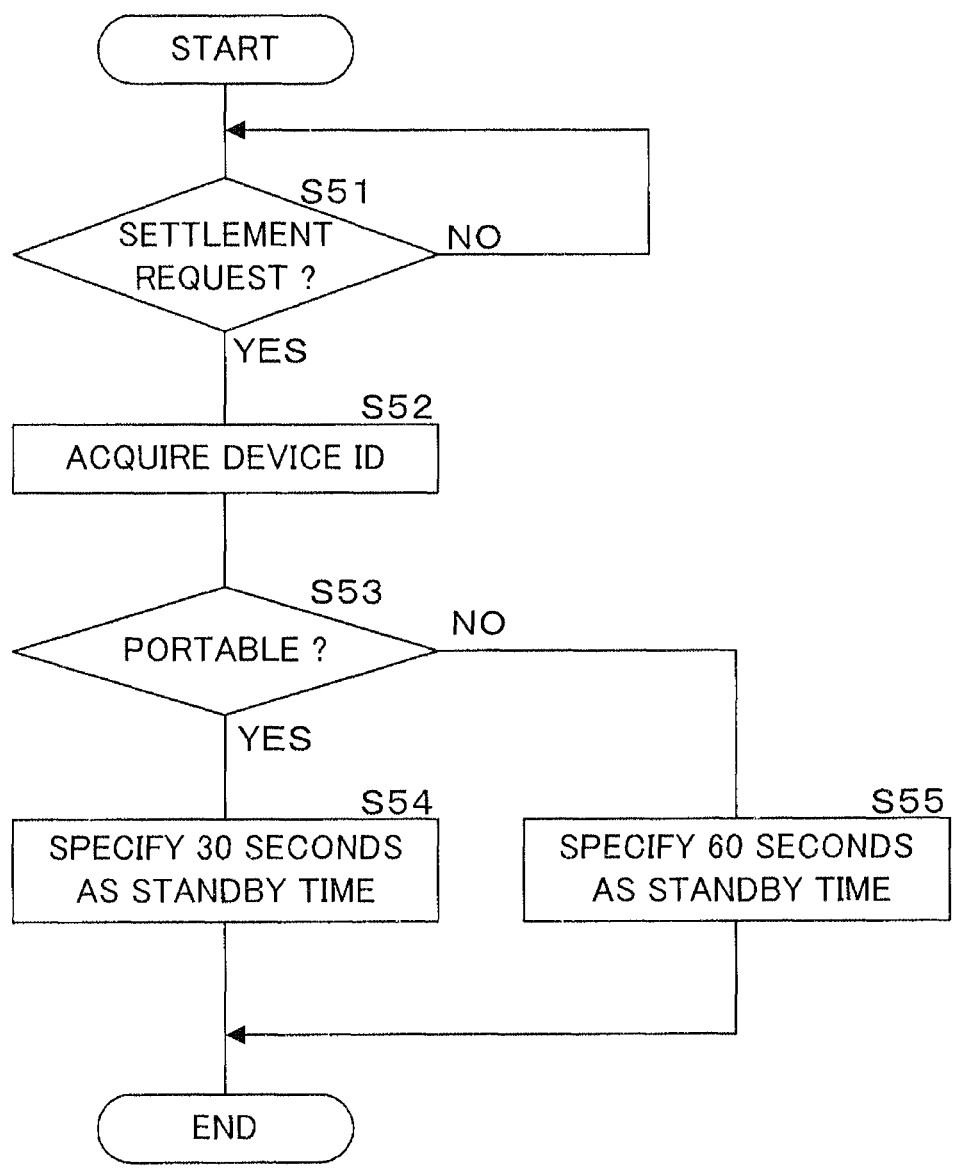
FIG. 20 is a flow chart illustrating a procedure of standby time control processing performed by a settlement server device according to Embodiment 2.

FIG. 20 is a flow chart illustrating a procedure of standby time control processing performed by the settlement server device 5 according to Embodiment 2. The processing unit 50 of the settlement server device 5 determines whether a settlement request has been received from the portable information processing device 1 or the floor-standing type information processing device 2 (step S51). If a settlement request has not been received (S51: NO), the processing unit 50 waits until a settlement request is received. If a settlement request has been received (S51: YES), the processing unit 50 acquires the device ID contained in the settlement request (step S52).

The processing unit 50 refers to the table or the like stored in the storage unit 51 on the basis of the acquired device ID so as to determine whether the device having transmitted the settlement request is portable (step S53). If it has been determined as being portable (S53: YES), the processing unit 50 specifies a short time such as 30 seconds as the standby time (step S54) and then terminates the processing. If it has been determined as not being portable (S53: NO), the processing unit 50 specifies a long time such as 60 seconds as the standby time (step S55) and then terminates the processing.

Here, the information transmitted from the portable information processing device 1 and the floor-standing type information processing device 2 to the settlement server device 5 is not limited to the device ID and may be various kinds of information other than this. As the information other than the device ID, for example, information described in the following modifications 7 to 9 may be transmitted from the portable information processing device 1 and the floor-standing type information processing device 2 to the settlement server device 5.

(Modification 7)

In the purchase and sale system according to modification 7, the portable information processing device 1 and the floor-standing type information processing device 2 transmit, to the settlement server device 5, information indicating the type of service used with the IC card 7, that is, the type of the service provided by the sales server device 3. For example, in the sales server device 3, the storage unit 31 stores a service ID attached to the service. Here, when the sales server device 3 provides a plurality of services, a plurality of service IDs may be imparted to one sales server device 3. When a settlement request is to be transmitted through the portable information processing device 1 or the floor-standing type information processing device 2 to the settlement server device 5, the sales server device 3 reads the service ID from the storage unit 31 and then transmits the service ID in a manner of being attached to the settlement request. The portable information processing device 1 and the floor-standing type information processing device 2 transmit to the settlement server device 5 the settlement request from the sales server device 3 together with the service ID contained therein.

The settlement server device 5 acquires the service ID contained in the settlement request received from the portable information processing device 1 or the floor-standing type information processing device 2 and then determines the standby time on the basis of the service ID. In the settlement server device 5, the storage unit 51 stores a table in which the service ID and the standby time are related to each other. Thus, the table is referred to on the basis of the service ID acquired from the settlement request, so that the standby time is determined. For example, the settlement server device 5 may determine the standby time for an online sales service of company A to be 60 seconds and determine the standby time for an online sales service of company B to be 30 seconds.

(Modification 8)

In the purchase and sale system according to modification 8, information concerning the user who uses the online sales system, that is, the user who uses the portable information processing device 1 or the floor-standing type information processing device 2 is transmitted from the portable information processing device 1 or the floor-standing type information processing device 2 to the settlement server device 5. For example, in the portable information processing device 1 and the floor-standing type information processing device 2, the storage unit 11 stores the user ID attached to the user. In the portable information processing device 1 and the floor-standing type information processing device 2, when a settlement request from the sales server device 3 is to be transmitted to the settlement server device 5, the user ID is read from the storage unit 11 and then transmitted in a manner of being attached to the settlement request.

The settlement server device 5 acquires the user ID contained in the settlement request received from the portable information processing device 1 or the floor-standing type information processing device 2 and then determines the standby time on the basis of the user ID. For example, the settlement server device 5 accumulates, for each user, information concerning the frequency of settlement processing, the ratio of success/failure of settlement processing, and the like. Then, the settlement server device 5 determines the standby time on the basis of the user ID and the accumulated information. For example, the settlement server device 5 may set the standby time to be a short time for users having a high frequency of settlement processing and a high ratio of failed settlement processing and may set the standby time to be a long time for the other users.

(Modification 9)

In the purchase and sale system according to modification 9, the sales server device 3 generates information concerning the user and then transmits it together with the settlement request. For example, in the sales server device 3 according to modification 9, for each user who uses the online sales system, the storage unit 31 stores information concerning: whether credit card information used by the user is registered; whether information such as the address and the telephone number is registered; and whether the right or wrong of such registered personal information has been confirmed. On the basis of such personal information stored in the storage unit 31, the sales server device 3 determines whether the user is a user whose sufficient personal information is registered. For the user having provided a purchase request, the sales server device 3 transmits user information indicating whether sufficient personal information is registered, in a manner of being attached to the settlement request.

The settlement server device 5 acquires the user information contained in the settlement request received from the portable information processing device 1 or the floor-standing type information processing device 2 and then determines the standby time on the basis of the user information. When sufficient personal information about the user concerning settlement processing is registered, the settlement server device 5 sets the standby time to be a long time such as 60 seconds. In contrast, when sufficient personal information is not registered, the settlement server device 5 sets the standby time to be a short time such as 30 seconds.

The purchase and sale system of the above-described configuration according to Embodiment 2 has a configuration that the settlement server device 5 controls the standby time for which the portable information processing device 1 or the floor-standing type information processing device 2 waits for non-contact communication with the IC card 7. By virtue of this, the settlement server device 5 is allowed to administer individually the standby time of the information processing device serving as the counterpart performing the settlement processing. The portable information processing device 1 and the floor-standing type information processing device 2 transmits, to the settlement server device 5, settlement information relevant to the settlement processing and then the settlement server device 5 determines the standby time on the basis of the received settlement information. For example, employable settlement information may be: the device ID identifying the type of the information processing device; information identifying whether the information processing device is portable; the service ID identifying the type of the service; the user ID identifying the user; or information identifying whether given information concerning the user is registered. The settlement server device 5 determines the standby time on the basis of such settlement information so that the standby time is allowed to be controlled suitably for the usage state or the like of the purchase and sale system.

According to the present technique, it is expected that data is allowed to be read reliably from a data storage medium storing data related to settlement or the like and/or data is allowed to be written into the data storage medium or that unauthorized data acquisition from a data storage medium storing data related to settlement is allowed to be prevented or suppressed.

In the present specification, it is to be understood that even for a component or the like described in the singular form with an article "a" or "an", a plurality of such components are not excluded.

What is claimed is:

1. A portable information processing device performing settlement processing concerning purchase of a merchandise article or a right in cooperation with a given server, comprising:
   a non-contact communication unit performing non-contact communication with a data storage medium;
   a data acquisition unit acquiring data stored in the data storage medium, through the non-contact communication unit as a part of the settlement processing;
   a settlement processing unit performing settlement based on the data acquired by the data acquisition unit, in cooperation with the server, as a part of the settlement processing;
   a detection unit detecting at least one of attitude, movement, and a placement state of the own device; and
   a restriction unit acquiring a detection result from the detection unit and then, when the detection result does not satisfy a given condition, restricting performing of at least a part of the settlement processing.

2. The portable information processing device according to claim 1, wherein:
   the portable information processing device further comprises a non-settlement processing unit performing given non-settlement processing which is processing concerning the purchase of a merchandise article or a right and other than settlement; and
   the non-settlement processing unit performs the given non-settlement processing regardless of the attitude, the movement, and the placement state of the own device.

3. The portable information processing device according to claim 1, wherein the restriction unit restricts execution of only a part of the settlement processing.

4. The portable information processing device according to claim 1, wherein the restriction unit does not perform the restriction on processing posterior to the acquisition of data performed by the data acquisition unit within the settlement processing.

5. The portable information processing device according to claim 1, wherein as the restriction, the restriction unit restricts execution of the acquisition processing of data from the data storage medium performed by the data acquisition unit in the own device.

6. The portable information processing device according to claim 1, wherein
   the data acquisition unit executes:
   standby processing of waiting for the data storage medium to come near the non-contact communication unit; and
   read processing of, when the data storage medium has become close in the standby processing, reading data of the data storage medium through the non-contact communication unit, and wherein
   as the restriction, the restriction unit executes the processing of restriction during the execution of the standby processing and then, in the processing of restriction, when the detection result obtained by the detection unit does not satisfy the given condition, terminates or stops the standby processing.

7. The portable information processing device according to claim 6, further comprising:

an operation sensing unit executing operation sensing processing of sensing given operation performed by a user;

an operation request unit, when during the execution of the standby processing, the detection result obtained by the detection unit had not satisfied the given condition so that the restriction unit has terminated or stopped the standby processing, executing operation request processing of requesting the given operation; and a standby processing restart unit, with adopting as a condition the sensing of the given operation by the operation sensing unit, executing the processing of starting or restarting the standby processing.

8. The portable information processing device according to claim 1, wherein:
the settlement processing unit includes a transaction execution unit executing given transaction processing for settlement in cooperation with the server; and
after the data has been acquired by the data acquisition unit, the transaction execution unit executes the transaction processing regardless of the attitude, the movement, and the placement state of the own device.

9. The portable information processing device according to claim 1, wherein:
the settlement processing unit performs at least transmission processing of transmitting to the server the data acquired by the data acquisition unit; and
the restriction unit restricts execution of the processing prior to transmission of the data to the server in the transmission processing within the processing performed by the settlement processing unit.

10. The portable information processing device according to claim 1, wherein:
the portable information processing device executes purchase processing including purchase object specification processing of specifying a purchase object on the basis of user input; and
the restriction unit, within the purchase processing, executes the restriction in a first purchase processing duration encompassing at least the settlement processing and does not execute the restriction in a second purchase processing duration encompassing at least the purchase object specification processing.

11. The portable information processing device according to claim 10, wherein the first purchase processing duration begins at a time point of start of non-contact communication acceptance for acquiring the data stored in the data storage medium.

12. The portable information processing device according to claim 1, wherein the restriction unit, within the settlement processing, executes the restriction in a first duration and does not execute the restriction in a second duration posterior to the first duration.

13. The portable information processing device according to claim 12, wherein the first duration begins at a time point of start of non-contact communication acceptance for acquiring the data stored in the data storage medium.

14. The portable information processing device according to claim 1, wherein the restriction unit stops acceptance of non-contact communication performed through the non-contact communication unit by the data acquisition unit for the purpose of acquiring the data stored in the data storage medium.

15. The portable information processing device according to claim 14, wherein:
the non-contact communication unit performs polling for the purpose of detecting the data storage medium; and
the restriction unit stops the polling performed by the non-contact communication unit.

16. The portable information processing device according to claim 1, comprising a display processing unit performing the processing of displaying on a display unit an image prompting a situation that the detection result obtained by the detection unit may satisfy the given condition.

17. The portable information processing device according to claim 16, wherein when the restriction unit has restricted the settlement processing, the display processing unit performs the processing of displaying the image.

18. The portable information processing device according to claim 1, wherein the restriction unit, with adopting as the given condition a situation that a given part of the own device is substantially horizontal, restricts execution of at least a part of the settlement processing.

19. The portable information processing device according to claim 18, comprising a housing of polyhedron shape, wherein
the restriction unit, with adopting as the given condition a situation that one surface of the housing is substantially horizontal, restricts execution of at least a part of the purchase processing.

20. The portable information processing device according to claim 19, wherein the one surface is a surface through which the non-contact communication unit is allowed to perform non-contact communication with the data storage medium.

21. The portable information processing device according to claim 1, comprising a housing of polyhedron shape, wherein:
one surface of the housing is a non-contact communication surface through which the non-contact communication unit is allowed to perform non-contact communication with the data storage medium; and
the restriction unit, with adopting as the given condition a situation that the detection result of the detection unit indicates that the non-contact communication surface is oriented to a gravity direction and a given part of the own device is substantially horizontal, restricts execution of at least a part of the settlement processing.

22. The portable information processing device according to claim 1, comprising a housing of polyhedron shape, wherein:
one surface of the housing is a non-contact communication surface through which the non-contact communication unit is allowed to perform non-contact communication with the data storage medium; and
the restriction unit, with adopting as the given condition a situation that the detection result of the detection unit indicates that the non-contact communication surface is oriented to a direction opposite to a gravity direction and a given part of the own device is substantially horizontal, restricts execution of at least a part of the settlement processing.

23. The portable information processing device according to claim 1, wherein the restriction unit, with adopting as an additional condition a situation that the detection result of the detection unit continues satisfying the given condition for a given time or longer, restricts execution of at least a part of the settlement processing.

24. The portable information processing device according to claim 1, wherein the restriction unit, with adopting as the given condition a situation that a given part of the own device is substantially horizontal and the substantially horizontal state is maintained for a given time or longer, restricts execution of at least a part of the settlement processing.

25. The portable information processing device according to claim 1, wherein the restriction unit, with adopting as the given condition a situation that the own device is in a substantially stationary state, restricts execution of at least a part of the settlement processing.

26. The portable information processing device according to claim 25, wherein the restriction unit, with adopting as the given condition a situation that an attitude change or the movement does not exceed a given limit, restricts execution of at least a part of the settlement processing.

27. The portable information processing device according to claim 1, comprising an information processing unit performing information processing concerning a game.

28. The portable information processing device according to claim 10, wherein the second purchase processing duration is a duration posterior to the acquisition of data performed by the data acquisition unit.

29. The portable information processing device according to claim 1, wherein on the basis of the detection result obtained by the detection unit, the restriction unit determines at least one of a situation that the attitude of the own device is substantially horizontal and a situation that the own device is in a stationary, and then, when the determination is not satisfied, restricts execution of at least a part of the settlement processing.

30. The portable information processing device according to claim 2, wherein as the non-settlement processing, the portable information processing device executes purchase object specification processing of specifying a purchase object on the basis of user input.

31. A settlement system comprising a portable user device and a settlement server and performing settlement processing concerning purchase of a merchandise article or a right, wherein
the user device includes:
a non-contact communication unit performing non-contact communication with a data storage medium; and
a data acquisition unit acquiring data stored in the data storage medium, through the non-contact communication unit as a part of the settlement processing, and wherein
the system includes:
a settlement processing unit performing settlement corresponding to the data acquired by the data acquisition unit, as a part of the settlement processing;
a detection unit detecting at least one of attitude, movement, and a placement state of the user device; and
a restriction unit acquiring a detection result from the detection unit and then, when the detection result does not satisfy a given condition, restricting performing of at least a part of the settlement processing.

32. A settlement system comprising: a data storage medium provided with a storage unit storing data and with a non-contact communication unit performing non-contact communication; and a portable information processing device performing settlement processing concerning purchase of a merchandise article or a right in cooperation with a given server, wherein
the portable information processing device includes:
a non-contact communication unit performing non-contact communication with the data storage medium;
a data acquisition unit acquiring data stored in the storage unit of the data storage medium, through the non-contact communication unit;
a settlement processing unit performing settlement concerning the purchase in cooperation with the server on the basis of the data acquired by the data acquisition unit;
a detection unit detecting at least one of attitude, movement, and a placement state of the own device; and
a restriction unit, when a detection result obtained by the detection unit does not satisfy a given condition, restricting performing of at least a part of the settlement processing.

33. The settlement system according to claim 32, wherein the data storage medium is an IC card allowed to be used for payment of transportation fare.

34. A computer-readable non-transitory recording medium storing an information processing program causing a portable information processing device that includes a non-contact communication unit performing non-contact communication with a data storage medium and a detection unit detecting at least one of attitude, movement, and a placement state of the own device and that performs settlement processing concerning purchase of a merchandise article or a right in cooperation with a given server, to operate as:
a settlement request transmission unit transmitting a settlement request in the purchase processing, to the server on the basis of data acquired from the data storage medium through the non-contact communication unit; and
a restriction unit, when a detection result obtained by the detection unit does not satisfy a given condition, restricting performing of at least a part of the settlement processing.

35. An information processing method of, by using a portable information processing device that includes a non-contact communication unit performing non-contact communication with a data storage medium and a detection unit detecting at least one of attitude, movement, and a placement state of the own device and that performs settlement processing concerning purchase of a merchandise article or a right in cooperation with a given server:
acquiring data stored in the data storage medium, through the non-contact communication unit;
performing settlement in the purchase processing, on the basis of the acquired data in cooperation with a given server; and
when a detection result obtained by the detection unit does not satisfy a given condition, restricting performing of at least a part of the settlement processing.

* * * * *